United States Patent
Bang et al.

(10) Patent No.: US 12,355,694 B2
(45) Date of Patent: Jul. 8, 2025

(54) METHOD AND APPARATUS FOR TRANSMITTING AND RECEIVING REFERENCE SIGNAL IN WIRELESS COMMUNICATION SYSTEM

(71) Applicant: SAMSUNG ELECTRONICS CO., LTD., Suwon-si (KR)

(72) Inventors: Jonghyun Bang, Seongnam-si (KR); Jungmin Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 448 days.

(21) Appl. No.: 17/659,686

(22) Filed: Apr. 19, 2022

(65) Prior Publication Data

US 2022/0353033 A1 Nov. 3, 2022

(30) Foreign Application Priority Data

Apr. 23, 2021 (KR) .................. 10-2021-0053165
Jul. 13, 2021 (KR) .................. 10-2021-0091822

(51) Int. Cl.
*H04L 5/00* (2006.01)
*H04W 72/23* (2023.01)

(52) U.S. Cl.
CPC .......... *H04L 5/0048* (2013.01); *H04L 5/0078* (2013.01); *H04W 72/23* (2023.01)

(58) Field of Classification Search
CPC ... H04L 5/0048; H04L 5/0078; H04L 5/0007; H04L 5/0092; H04L 5/005; H04L 5/0053;
(Continued)

(56) References Cited

U.S. PATENT DOCUMENTS 10,447,319 B1 10/2019 Lee et al.
10,608,799 B2 3/2020 Nam et al.
(Continued)

FOREIGN PATENT DOCUMENTS

KR 10-2018-0122835 11/2018
KR 10-2018-0135869 12/2018
(Continued)

OTHER PUBLICATIONS

Partial European Search Report dated Sep. 27, 2022 in corresponding European Patent Application No. 22168362.6 (12 pages).
(Continued)

*Primary Examiner* — Jamal Javaid
(74) *Attorney, Agent, or Firm* — MORGAN, LEWIS & BOCKIUS LLP

(57) ABSTRACT

A method of operation of a terminal in a wireless communication system includes receiving a synchronization signal block (SSB) from a base station, decoding a master information block (MIB) included in the SSB, identifying a value based on at least one of subcarrier spacing (SCS) of the MIB, subcarrier offset for the SSB, and a reserved bit included in the SSB or MIB, and determining whether setting information related to a phase tracking reference signal (PTRS) is included in a physical downlink shared channel (PDSCH) or a physical uplink shared channel (PUSCH) for initial connection, based on the identified value.

15 Claims, 12 Drawing Sheets

(58) Field of Classification Search
CPC ............. H04W 72/23; H04W 72/1215; H04W 72/0453; H04W 48/12
See application file for complete search history.

(56) References Cited

U.S. PATENT DOCUMENTS

| | | | |
|---|---|---|---|
| 10,917,280 | B2 | 2/2021 | Kim et al. |
| 10,951,374 | B2 | 3/2021 | Lee et al. |
| 2020/0196254 | A1* | 6/2020 | Kerhuel ................ H04L 5/0048 |
| 2020/0287678 | A1 | 9/2020 | Li et al. |
| 2020/0396760 | A1 | 12/2020 | Yi et al. |
| 2021/0045145 | A1 | 2/2021 | Yoshimura et al. |
| 2021/0058207 | A1* | 2/2021 | Lee ....................... H04L 5/0007 |
| 2022/0321299 | A1 | 10/2022 | Harada et al. |

FOREIGN PATENT DOCUMENTS

| | | |
|---|---|---|
| KR | 10-2018-0136774 | 12/2018 |
| KR | 10-2019-0000459 | 1/2019 |
| KR | 10-2021-0007706 | 1/2021 |
| WO | 2020146275 | 7/2020 |
| WO | 2020-0237551 | 12/2020 |
| WO | 2020-261463 | 12/2020 |

OTHER PUBLICATIONS

Extended European Search Report dated Feb. 20, 2023 in corresponding European Patent Application No. 22168362.6 (13 pages).

* cited by examiner

METHOD AND APPARATUS FOR TRANSMITTING AND RECEIVING REFERENCE SIGNAL IN WIRELESS COMMUNICATION SYSTEM

CROSS-REFERENCE TO RELATED APPLICATIONS

This application is based on and claims priority under 35 U. S. C. § 119 to Korean Patent Application Nos. 10-2021-0053165 and 10-2021-0091822, filed on Apr. 23, 2021, and Jul. 13, 2021, in the Korean Intellectual Property Office, the disclosures of which are incorporated by reference herein in their entirety.

BACKGROUND

The inventive concept relates to a method and an apparatus for transmitting and receiving a reference signal, and more particularly, to a method and an apparatus for transmitting and receiving a phase tracking reference signal (PTRS).

In order to satisfy increasing wireless data traffic demand after the commercialization of $4^{th}$ generation (4G) communication systems, efforts are being made to develop improved $5^{th}$ generation (5G) communication systems or pre-5G communication systems. Therefore, 5G communication systems or pre-5G communication systems are referred to as beyond 4G network communication systems or post long term evolution (LTE) systems. In order to obtain a high data rate, a 5G communication system is considered for implementation in an ultrahigh frequency (mmWave) band (for example, 60 GHz).

In some 5G communication systems, techniques such as beam-forming technology, massive multiple input and multiple output (MEM) technology, full dimensional (FD) MIMO technology, array antenna technology, analog beam-forming technology, large scale antenna technology, etc. may be implemented to reduce radio propagation path loss in the ultrahigh frequency band and to increase a propagation distance. Additionally, many other technologies are being developed for 5G systems, for example, such as evolved small cell technology, advanced small cell technology, cloud radio access network (RAN) technology, ultra-dense network technology, device to device (D2D) communication technology, wireless backhaul technology, moving network technology, cooperative communication technology, coordinated multi-points (COMP) technology, receive interference cancellation technology, a hybrid frequency shift, keying (FSK) and QAM modulation (FQAM) method and a sliding window superposition coding (SWSC) method as advanced coding modulation (ACM) methods and filter bank multicarrier (FBMC) technology, non-orthogonal multiple access (NOMA) technology, and sparse code multiple access (SCMA) technology as advanced access technologies.

Moreover, the Internet is continuously being developed for improvements to human-centered networks (e.g., Internet networks in which human beings generate and consume information) and Internet of things (IoT) networks (e.g., Internet networks in which information is transmitted to and received from distributed components such as various smart home devices, factory automation devices, etc.). In Internet of everything (IoE) technology, big data processing technology may be implemented through IoT networks connection to a cloud server. In order to implement the IoT, technological elements such as sensing technology, wired and wireless communication and network infra, service interface technology, and security technology are implemented. Therefore, technologies such as a sensor network for connection among things, machine to machine (M2M) communication, and machine type communication (MTC) are being developed. In an IoT environment, an intelligent Internet technology (IT) service creating new value in human lives by collecting and analyzing data generated from connected things may be provided. The IoT may be applied to fields such as smart homes, smart buildings, smart cities, smart cars or connected cars, smart grids, health care, smart home appliances, and advance medical care through convergence and combination between conventional information technology (IT) and various industries.

Accordingly, various attempts to apply 5G communication system technologies to IoT networks are being explored. For example, IoT technologies (e.g., such as the sensor network, M2M, MTC, etc.) may be implemented using 5G communication techniques such as beamforming, multiple input multiple output (MIMO), and array antenna techniques. Application of a cloud radio access network (RAN) (e.g., as in the above-described big data processing technology) may be an example of convergence between 5G technology and IoT technology.

As various services may be provided in accordance with the development of the above-described wireless communication systems, improved techniques and methods for smoothly providing such services may be desired.

SUMMARY

The inventive concept relates to transmitting and receiving a phase tracking reference signal before an initial transmission stage.

According to an aspect of the inventive concept, there is provided a method of operating a terminal in a wireless communication system, including receiving a synchronization signal block (SSB) from a base station, decoding a master information block (MIB) included in the SSB, identifying a value corresponding to at least one of a subcarrier spacing (SCS) of the MIB, a subcarrier offset for the SSB, and a reserved bit of the MIB, and determining whether setting information of a phase tracking reference signal (PTRS), for an initial connection with the base station, is included in a physical downlink shared channel (PDSCH) or a physical uplink shared channel (PUSCH) based on the identified value.

According to an aspect of the inventive concept, there is provided a method of operating a terminal in a wireless communication system, including receiving downlink control information (DCI) from a base station, determining whether a transmission indicator for a phase tracking reference signal (PTRS) is included in the DCI, identifying a radio network temporary identifier (RNTI) used by the base station to scramble the DCI, and determining whether the PTRS, used for an initial connection with the base station, is included in a physical downlink shared channel (PDSCH) or a physical uplink shared channel (PUSCH) based on at least one of the transmission indicator and the RNTI.

According to an aspect of the inventive concept, there is provided a method of operating a base station in a wireless communication system, including determining whether setting information of a phase tracking reference signal (PTRS), for an initial connection with a terminal, is included in a physical downlink shared channel (PDSCH) or a physical uplink shared channel (PDSCH) based on at least one of a subcarrier spacing (SCS) of a master information block (MIB) transmitted to the terminal, a subcarrier offset for a synchronization signal block (SSB), and a reserved bit of the MIB transmitted to the terminal, scrambling downlink control information (DCI) based on a predefined wireless network arbitrary identifier, and transmitting the DCI to the terminal.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Figure 1:
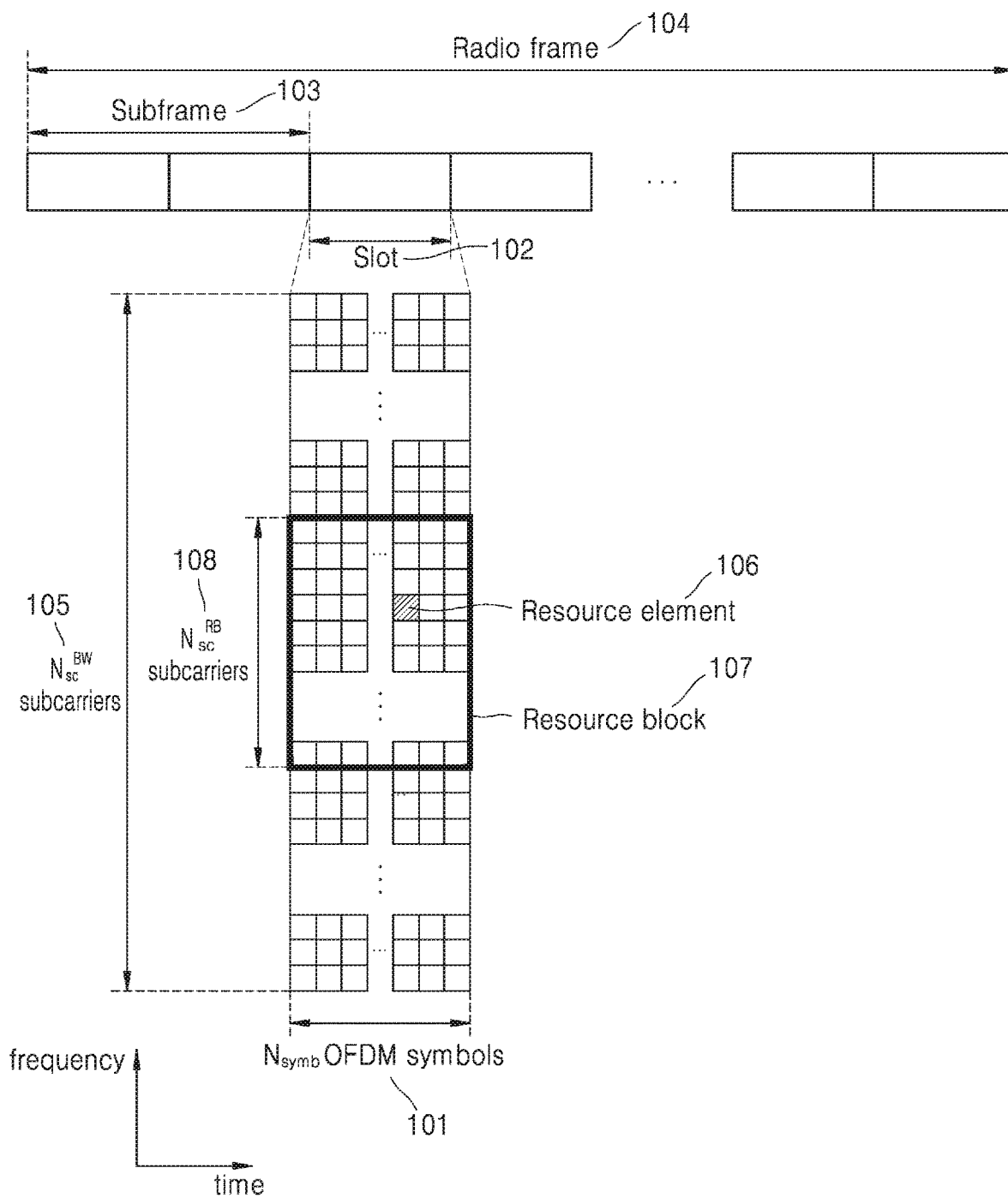
FIG. 1 illustrates a basic structure of a time-frequency domain as a radio resource area in which data or a control channel is transmitted in an uplink/downlink of a wireless communication system.

In an orthogonal frequency-division multiplexing (OFDM) based wireless communication system, communicating devices may estimate and compensate for a common phase error (CPE) that commonly exerts an influence on all OFDM subcarriers (e.g., using a reference signal in a frequency domain in order to estimate the phase error). In some cases, it is possible to reduce the influence of an inter-carrier interference (ICI) by estimating and compensating for the phase error in the unit of a symbol using a cyclic prefix (CP) in a time domain.

Moreover, the phase noise of a transmitter may increase as the frequency of operation increases. As such, wireless communication systems may employ pilot signals (e.g., a phase tracking reference signals (PTRSs)) that enable devices to estimate and compensate for phase distortion due to phase noise, Doppler effect, synchronization error, etc. Such pilot signals may play a crucial role especially at mmWave frequencies to minimize the effect of the oscillator phase noise on system performance. For instance, a PTRS may track phase information (e.g., phase of a local oscillator at transmitter and receiver). A PTRS enables suppression of phase noise and common phase error specially at higher mmWave frequencies.

In some examples, the PTRS may be present both in uplink channels (e.g., in a new radio (NR) physical uplink shared channel (NR-PUSCH)) and downlink channels (e.g., in NR physical downlink shared channel (NR-PDSCH)). Due to phase noise properties, PTRS may have low density in the frequency domain and high density in the time domain. In some cases, a PTRS may be associated with one DMRS port during transmission. Moreover, a PTRS may be confined to a scheduled bandwidth and a scheduled duration used for NR-PDSCH/NR-PUSCH, A NR system may map the PTRS information to a few subcarriers per symbol (e.g., because the phase rotation may affect all sub-carriers within an OFDM symbol equally, but the phase rotation may show low correlation from symbol to symbol).

As described above, phase noise introduced into an OFDM signal may appear as a common phase rotation of all the sub-carriers, known as common phase error (CPE). In conventional wireless communication systems, at an initial transmission stage (e.g., for an initial connection between a base station and a terminal through a master information block (MIB) in an initial connection stage), there are no efficient techniques for transmitting and receiving a PTRS. Further, when an initial transmission is performed in a high frequency band of 5G, due to a phase error, an initial transmission probability deteriorates.

According to techniques described herein, base station may efficiently set configure) PTRS transmission (e.g., to PDSCH or PUSCH) at an initial transmission stage. As described in more detail herein, may be configured at an initial transmission stage using a MIB, downlink control information (DCI), configured modulation and coding scheme (MCS), scheduled bandwidth, etc. For instance, in some examples, a field of a MIB may be used to configured PTRS at an initial transmission stage, a subcarrier spacing (SCS) of a MIB or subcarrier offset of a SSB may configure the PTRS at an initial transmission stage, a reserved bit of a MIB may configure the PTRS at an initial transmission stage, etc. Additionally or alternatively, a transmission indicator bit may be included in DCI to configure the PTRS at an initial transmission stage or a radio network temporary identifier (RNTI) used to scramble DCI may configure the PTRS at an initial transmission stage. In some cases, time density of PTRS may be notified to a terminal in accordance with a MCS index and frequency density of PTRS may be indicated based on a scheduling bandwidth.

Iii some aspects, the techniques described above (and in more detail below) may be used to configure and implement PTRS transmission at an initial transmission stage via usage of a look up table (LUT) or a previously stored mapping table. That is, predefined mapping information (e.g., previously stored mapping tables) may map a values (where each value corresponds to at least one of a SCS of a MIB, a subcarrier offset for a SSB, and a reserved bit of the MIB, RNTI used to scramble DCI, an indicator bit included in DCI, scheduled MCS, scheduled bandwidth, etc.) to PTRS setting information. As such, base stations and terminals may store such predefined mapping tables, such that PTRS may be configured based on identifying such values and mapping identified values to PTRS setting information.

Hereinafter, exemplary embodiments of the inventive concept will be described in detail with reference to the accompanying drawings.

FIG. 1 illustrates a basic structure of a time-frequency domain as a radio resource area in which data or a control channel is transmitted in an uplink/downlink of a wireless communication system.

Referring to FIG. 1, a horizontal axis represents a time domain and a vertical axis represents a frequency domain. A transmission unit (e.g., a minimum transmission unit) in the time domain is an orthogonal frequency-division multiplexing (OFDM) symbol or a discrete Fourier transform (DFT)-s-OFDM symbol and a number of symbols (e.g., $N_{symb}$ OFDM or $N_{symb}$ DFT-s-OFDM symbols 101) configure (e.g., or are included in) one slot 102. Here, the OFDM symbol is used when a signal is transmitted and received by using an OFDM method and the DFT-s-OFDM symbol is used when a signal is transmitted and received by using a DFT-s-OFDM or SC-frequency division multiple access (FDMA) method.

Hereinafter, according to the inventive concept, for convenience sake, without distinguishing the OFDM symbol from the DFT-s-OFDM symbol, description may be made by using the OFDM symbol based on downlink signal transmission and reception. However, the inventive concept may also be applied generally to uplink signal transmission and reception by analogy, without departing from the scope of the present disclosure.

When the subcarrier spacing (SCS) is 15 kHz, one slot configures one sub-frame 103 and each of lengths of the slot and the sub-frame is 1 ms. At this time, the number of slots configuring the one sub-frame 103 and the length of the slot may vary in accordance with the SCS. For example, when the SCS is 30 kHz, two slots may configure the one sub-frame 103. At this time, the length of the slot is 0.5 ms and the length of the sub-frame is 1 ins. A radio frame 104 is a time domain interval including ten sub-frames. A minimum transmission unit in the frequency domain is a subcarrier and a system transmission bandwidth includes a number of subcarriers (e.g., $N_{SC}^{BW}$ subcarriers 105). The specific numerical value may be variably applied. For example, in a long term evolution (LTE) system, the subcarrier spacing is 15 kHz. However, two slots configure the one sub-frame 103. At this time, the length of the slot is 0.5 ms and the length of the sub-frame is 1 ms.

In the time-frequency domain, a basic unit of resource is a resource element (RE)) 106 and may be represented as an OFDM symbol index and a subcarrier index. A resource block (RB) 107 or a physical resource block (PRB) may be defined as $N_{symb}$ 101 continuous OFDM symbols in the time domain and $N_{SC}^{RB}$ 108 continuous subcarriers in the frequency domain. Therefore, in one slot, the RB 107 may include $N_{symb} \times N_{SC}^{RB}$ Res. In general, a minimum assignment unit in the frequency domain of data is the RB 107. In a new radio (NR) system, in general, $N_{symb}=14$, $N_{SC}^{RB}=12$, and the number NIB of RBs may vary in accordance with the system transmission bandwidth. In the LTE system, in general, $N_{symb}=7$, $N_{SC}^{RB}=12$, and the number $N_{RB}$ of RBs may vary in accordance with the system transmission bandwidth.

Downlink control information (DCI) may be transmitted within initial N OFDM symbols in the sub-frame. In general, N={1, 2, 3} and a terminal may receive the number of symbols within which the DCI may be transmitted from a base station through an upper signal. In addition, in accordance with an amount of control information to be transmitted in a current slot, the base station may vary the number of symbols within which the DCI may be transmitted in the slot per slot and the base station may transmit information on the number of symbols to the terminal through a separate downlink control channel.

In NR, one component carrier (CC) or serving cell may include up to 250 or more RBs. Therefore, when the terminal receives a serving cell bandwidth (e.g., like the LTE system), power consumption of the terminal may be undesirably high. In order to reduce terminal power consumption, the base station may set one or more bandwidth parts (BWP) for the terminal and may support the terminal to change a reception area in a cell (e.g., to reduce the bandwidth to one or more BWPs and reduce terminal power consumption for reception operations). In NR, the base station may set 'initial BWP' as a bandwidth of CORESET #0 (or common search space (CSS)) for the terminal through a master information block (MIB). Then, the base station may set an initial BWP of the terminal through radio resource control (RRC) signaling and may notify one or more BWP setting information items that may be indicated through the DCI. Then, the base station may indicate which band to use for the terminal by announcing a MVP identity (ID) through the DCI. When the terminal does not receive the DCI from a currently assigned BWP for no less than a certain time, the terminal returns to 'default BWP' and tries to receive the DCI.

Figure 2:
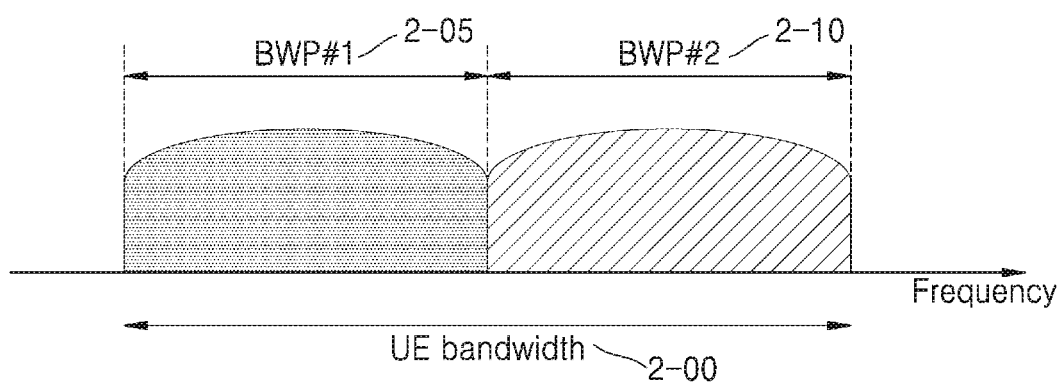
FIG. 2 illustrates a bandwidth part (BWP) in a wireless communication system according to an exemplary embodiment of the inventive concept.

FIG. 2 illustrates a bandwidth part (BWP) in a wireless communication system according to an exemplary embodiment of the inventive concept.

FIG. 2 illustrates an example in which a terminal bandwidth 2-00 is set to have two BWPs, that is, a first BWP 2-05 and a second BWP 2-10. A base station may set a BWP or a plurality of BWPs for a terminal and may set the following information items for each BWP.

TABLE 1

```
BWP ::= SEQUENCE {
    bwp-Id              BWP-Id,
    locationAndBandwidth INTEGER (1..65536),
    subcarrierSpacing   ENUMERATED {n0, n1, n2, n3, n4, n5},
    cyclicPrefix        ENUMERATED { extended }
}
```

The inventive concept is not limited to the above-described embodiment and various parameters related to the BWP other than setting information may be set for the terminal by analogy, without departing from the scope of the present disclosure. In some examples, © base station may transmit the above-described information items to the terminal through upper layer signaling (e.g., such as the RRC signaling). At least one BWP (e.g., the one set BWP or a BWP from the plurality of set BWPs) may be activated. In some cases, indication of whether the set BWP is activated may be semi-statically transmitted from the base station to the terminal through the RRC signaling or indication of whether the set BWP is activated may be dynamically transmitted to the terminal through a mandatory access control (MAC) control element (CE) or the DCI.

In an embodiment, the terminal (before RRC connection is established) may receive the initial BWP for initial connection from the base station through the MIB. More specifically, the terminal may receive setting information on a control area (or a control resource set (CORESET)) and a search space to which a physical downlink control channel (PDCCH) is transmitted. The setting information be transmitted by the base station in order for the terminal to receive system information (that may correspond to remaining system information (RMSI) or system information block 1 (SIB1)) to be utilized by the terminal for the initial connection through the MIB in an initial connection stage. In some examples, an ID of each of the control area and the search space set as the MIB may be considered as 0.

In some example, the base station may notify setting information (e.g., such as frequency assignment information, time assignment information, and numerology on the control area #0) to the terminal through the MIB. In addition, the base station may notify a monitoring cycle for the control area #0 and setting information on occasion, that is, setting information on an search space #0 to the terminal through the MIB. The terminal may consider the frequency domain set as the control area #0 obtained by the MIB as the initial BWP for the initial connection. At this time, an ID of the initial BWP may be considered as 0.

In the above-described method of setting the BWP, terminals (before establishing the RRC connection) may receive setting information on the initial BWP through the MIB in the initial connection stage. More specifically, the terminal may receive the control area (or the CORESET) for the downlink control channel to which the DCI scheduling an SIB may be transmitted from the MIB of the PBCH. A bandwidth of the control area set as the MIB may be considered as the initial BWP and the terminal may receive a physical downlink shared channel (PDSCH) to which the SIB is transmitted through the set initial BWP. The initial BWP may be used for other system information (OSI), paging, random access as well as for receiving the SIB.

In the wireless communication system, the terminal undergoes the following initial connection stage in order to form a wireless link with the base station. First, in order to access a cell in a network, the terminal may perform a cell search for obtaining synchronization with the cell in the network and the terminal may obtain the MIB through PBCH decoding. The MIB includes basic information for accessing a system. The SIB is obtained by performing decoding on the PDCCH and the PDSCH based on the information (e.g., based on information of the MIB), Then, identity is exchanged with the base station through a random access stage and initial connection to a network is performed through registration and certification. Hereinafter, a cell initial connection operation process of the 5G wireless communication system is described in more detail herein (e.g., with reference to FIG. 3).

Figure 3:
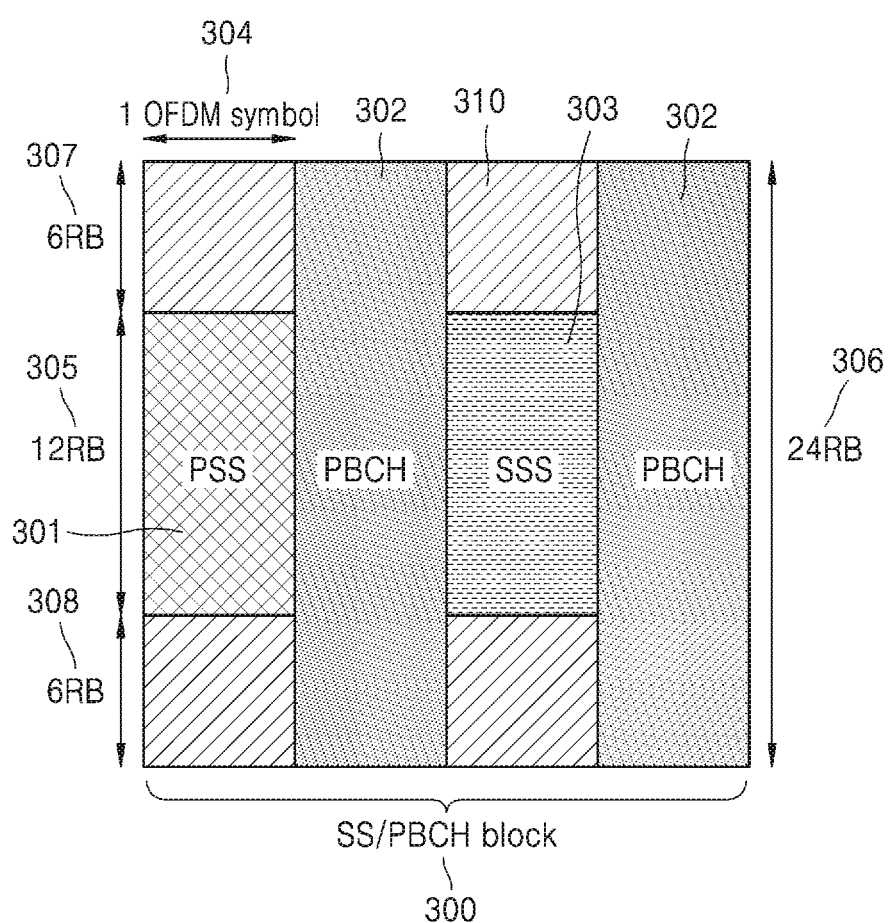
FIG. 3 illustrates a synchronization signal and physical broadcast channel (PBCH) block considered in a $5^{th}$ generation (5G) communication system.

FIG. 3 illustrates a synchronization signal and physical broadcast channel (PBCH) block (SS/PBCH block) 300 considered in a 5$^{th}$ generation (5G) communication system.

Referring to FIG. 3, the SS/PBCH block 300 includes a primary synchronization signal (PSS) 301, a secondary synchronization signal (SSS) 303, and a PBCH 302. The PSS 301 and the SSS 303 may be transmitted to 12 RBs 305 in a frequency axis and to one OFDM symbol 304 in a time axis. 1,008 different cell IDs may be defined in 5G, the PSS 301 may have three different values in accordance with a physical layer ID of a cell, and the SSS 303 may have 336 different values. The terminal may grasp one of the 1,008 different cell IDs by detection and combination of the PSS 301 and the SSS 303, which may be represented by the following equation:

$$N_{ID}^{cell}=3N_{ID}^{(1)}+N_{ID}^{(2)}$$

$N^{(1)}_{ID}$ may be estimated from the SSS 303 and has a value between 0 and 335. $N^{(2)}_{ID}$ may be estimated from the PSS 301 and has a value between 0 and 2. A value of $N^{cell}_{ID}$ as a cell may be estimated by a combination of $N^{(1)}_{ID}$ and $N^{(2)}_{ID}$.

The PBCH 302 may be transmitted to 24 RBs 306 in the frequency axis and to the one OFDM symbol 304 in the time axis. In the PBCH 302, various system information items referred to as the MIB may be transmitted and included contents are as follows.

TABLE 2

```
BWP ::= SEQUENCE {
    systemFrameNumber       BIT STRING (SIZE (6)),
    subCarrierSpacingCommon ENUMERATED {scs15or60, scs30or120},
    ssb-subCarrierOffset    INTEGER (0...15),
    dmrs-TypeA-Position     ENUMERATED {pos2, pos3},
    pdcch-ConfigSIB1        PDCCH-ConfigSIB1,
    cellBarred              ENUMERATED { barred, notBarred },
    IntrFreqReselection     ENUMERATED {allowed, notAllowed},
    spare                   BIT STRING (SIZE (1))
}
```

Referring to the Table, "dmrs-TypeA-Position" may refer to a position of a first demodulation reference signal (DMRS) of first downlink and uplink transmission. "pdcch-ConfigSIB1" may represent setting information on the CORESET, the CSS, and PDCCH parameter. "subCarrier-SpacingCommon" may refer to subcarrier spacing for receiving the SIB, message2/4 for initial connection, paging, and system information for broadcast. When the terminal obtains the MIB at FR1, a "scs1.5or60" value may refer to 15 kHz and a "scs30or120" value may refer to 30 kHz. When the terminal obtains the MIB at FR2, a "scs15or60" value may refer to 60 kHz and a "scs30or120" value may refer to 120 kHz. "ssb-SubCarrierOffset" as a subcarrier unit represents an offset value of synchronization signal block (SSB) and RB grid.

As described above, the SS/PBCH block 300 includes the PSS 301, the PBCH 302, and the SSS 303 and is mapped by four OFDM symbols in the time axis. Because a transmission bandwidth (the 12 RBs 305) of the PSS 301 and the SSS 303 is different from a transmission bandwidth (the 24 RBs 306) of the PBCH 302, in an OFDM symbol to which the PSS 301 and the SSS 303 are transmitted in the transmission bandwidth (the 24 RBs 306) of the PBCH 302, six RBs 307 and 308 are provided on both sides excluding the 12 RBs to which the PSS 301 and the SSS 303 are transmitted and the six RBs 307 and 308 may be used for transmitting another signal or may be empty.

An SSB may be transmitted with the same analog beam. That is, the PSS 301, the PBCH 302, and the SSS 303 may be transmitted with the same analog beam. In some aspects, an analog beam may not be applied to the frequency axis and the same analog beam may be applied to all the frequency axis RBs in a specific OFDM symbol to which specific analog beam is applied. That is, the PSS 301, the PBCH 302, and the SSS 303 may be transmitted to the four OFDM symbols with the same analog beam.

On the other hand, the terminal may obtain the SIB after performing decoding on the PDCCH and the PDSCH based on the system information included in the received MIB and the SIB may include at least an uplink cell bandwidth, a random access parameter, a paging parameter, and a parameter related to uplink power control. The terminal may form a wireless link with a network through a random access process based on synchronization with the network obtained in a cell search process of a cell and the system information. A contention-based access method or a contention-free access method may be used for the random access. When cell selection and reselection are performed in an initial connection process of the cell, the contention-based access method may be used for moving from an RRC IDLE state to an RRC CONNECTED state. The contention-free access method may be used for resetting uplink synchronization when downlink data reaches, when hand over is performed, or when a position is measured.

A random access channel (RACH) is a channel that may be shared by multiple terminals and may be used by the terminals to access the network for communications. For example, the RACH may be used for call setup and to access the network for data transmissions. In some cases, RACH may be used for initial access to a network when the terminal switches from a radio resource control (RRC) connected idle mode to active mode, or when handing over in RRC connected mode. Moreover, RACH may be used for downlink (DL) and/or uplink (UL) data arrival when the terminal is in RRC idle or RRC inactive modes, and when reestablishing a connection with the network.

Figure 4:
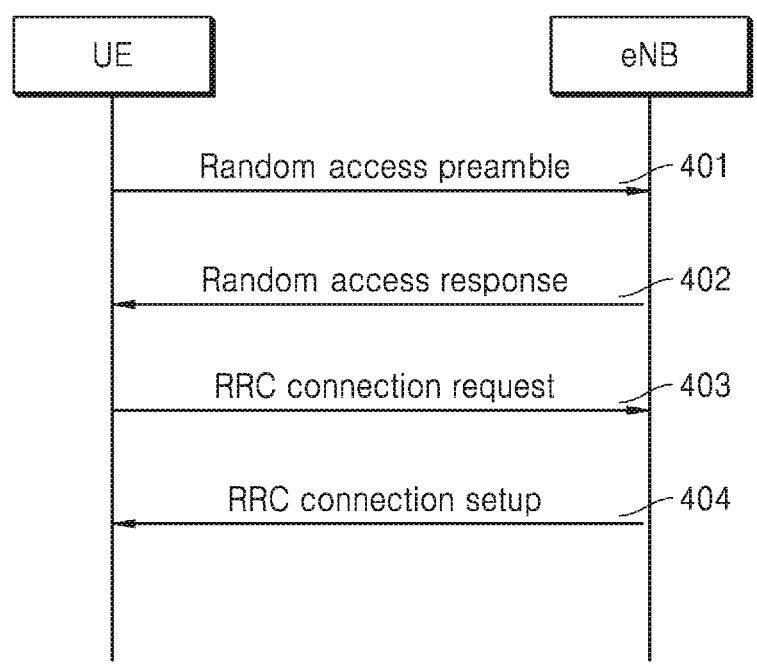
FIG. 4 illustrates a contention-based random access order in a new radio (NR) system.

FIG. 4 illustrates a contention-based random access order in a new radio (NR) system.

Referring to FIG. 4, in operation 401, in a first process, a terminal transmits a random access preamble so that a base station may estimate transmission timing of the terminal. The random access preamble is transmitted through an uplink physical layer channel corresponding to a physical random access channel (PRAM). Through operation 401 of transmitting the random access preamble, the base station may recognize that there is a random access attempt and may control uplink transmission timing by estimating a delay time between the terminal and the base station.

In operation 402, the base station transmits a random access response (RAR) to the detected random access attempt to the terminal. The RAR is transmitted through the PDSCH and may include the following message. For example, the RAR may include at least a random access preamble sequence index, a temporary cell radio network temporary identifier (TC-RNTI), an uplink scheduling grant, and a timing advance value.

The terminal that transmits the random access preamble monitors the PDCCH for the RAR within a set time. Frequency domain control information of the PDSCH to which the RAR is transmitted may be obtained from the DCI transmitted to the CSS of the PDCCH set by a random access (RA)-RNTI. The terminal that receives the RAR controls the uplink transmission timing and performs next operation.

In operation 403, the terminal transmits an L2/L3 message for RRC connection request to the base station. The terminal may transmit a message such as ID or hybrid automatic repeat request (HARQ) of the terminal by using uplink physical layer resource assigned to the RAR in operation 402. At this time, the message is transmitted through a physical uplink shared channel (PUSCH) that is an uplink physical channel set as the TC-RNTI.

In operation 403, the terminal receives a downlink message for contention resolution and RRC connection setup from the base station. The contention resolution message is transmitted through the PDSCH and scheduling information of the PDSCH may be obtained from the DCI transmitted to the PDCCH set as a cell (C)-RNTI. In some aspects, because contention resolution is not required in a contention-free random access process, only operation 401 and operation 402 of FIG. 4 are used.

Hereinafter, the DCI in a next generation mobile communication system (e.g., a 5G system or an NR system) are described.

In the next generation mobile communication system (e.g., a 5G or NR system), scheduling information of uplink data (e.g., PUSCH data) or downlink data (e.g., PDSCH data) may be transmitted from the base station to the terminal through the DCI. The terminal may monitor a fallback DCI format and a non-fallback DCI format for the PUSCH or the PDSCH. The fallback DCI format may consist of a fixed field predefined between the base station and the terminal and the non-fallback DCI format may include a configurable field.

The DCI may undergo a channel coding and modulation process and may be transmitted through the PDCCH. A cyclic redundancy check (CRC) may be attached to a DCI message payload and may be scrambled with an RNTI corresponding to an ID of the terminal. In accordance with an object of a DCI message, for example, terminal-specific data transmission, a power control command, or a random access response, different RNTIs may be used for scrambling the CRC attached to the DCI message payload. That is, the RNTI may not be explicitly transmitted and may be transmitted while being included in a CRC calculating process. When the DCI message transmitted to the PDCCH is received, the terminal may check the CRC by using the received RNTI. When the CRC is checked, the terminal may determine that the corresponding message is transmitted to the terminal.

For instance, a PDCCH may be transmitted within a control region (e.g., and one or more terminals may monitor the PDCCH). A Control Channel Element (CCE) may correspond to a logical allocation unit used for providing a PDCCH at a coding rate based on a wireless channel state. In some examples, a base station decides a PDCCH format in accordance with the DCI being transmitted to the terminal and adds a Cyclic Redundancy Check (CRC) to the control information. Depending upon the owner or usage of the PDCCH, the CRC may be masked by a Radio Network Temporary Identifier (RNTI). If the PDCCH is for a specific terminal, a cell-RNTI (C-RNTI) identifier of the terminal may be masked to the CRC. Alternatively, if the PDCCH is for a paging message, a Paging Indicator Identifier (P-RNTI) may be masked to the CRC. If the PDCCH is for a system information (more specifically, a system information block (SIB)), a system information identifier and a system information RNTI (SI-RNTI) may be masked to the CRC. In order to indicate the random access response, which is a response message to the transmission of a random access preamble of the terminal, a random access RNTI (RA-RNTI) may be masked to the CRC.

For example, the DCI scheduling the PDSCH for system information (SI) may be scrambled with an SI-RNTI. The DCI scheduling the PDSCH for an RAR message may be scrambled with the RA-RNTI. The DCI scheduling the PDSCH for a paging message may be scrambled with a paging (P)-RNTI. The DCI notifying a slot format indicator (SFI) may be scrambled with an SFI-RNTI. The DCI notifying transmit power control (TPC) may be scrambled with a TPC-RNTI. The DCI scheduling a terminal-specific PDSCH or PUSCH may be scrambled with the C-RNTI.

A DCI format 0_0 may be used as the fallback DCI scheduling the PUSCH. At this time, the CRC may be scrambled with the C-RNTI. In an embodiment, the DCI format 0_0 in which the CRC is scrambled with the C-RNTI may include at least information items included in the following table.

TABLE 3

- Identifier for DCI formats - [1] bit
- Frequency domain resource assignment -[$\lceil \log_2(N_{RB}^{UL,BWP}(N_{RB}^{UL,BWP}+1)/2) \rceil$] bits
- Time domain resource assignment - X bits
- Frequency hopping flag - 1 bit.
- Modulation and coding scheme - 5 bits
- New data indicator- 1 bit
- Redundancy version - 2 bits
- HARQ process number - 4 bits
- TPC command for scheduled PUSCH (Transmit power control command for scheduled PUSCH) - [2] bits
- UL/SUL indicator - 0 or 1 bit In the example of Table 3, a DCI format 0_1 may be used as the non-fallback DCI scheduling the PUSCH. At this time, the CRC may be scrambled with the C-RNTI.

In an embodiment, the DCI format 0_1 in which the CRC is scrambled with the C-RNTI may include the following information items.

TABLE 4

- Carrier indicator-0 or 3 bits
- UL/SUL indicator-0 or 1 bits
- Identifier for DCI formats-[1] bits
- Bandwidth part indicator-0, 1 or 2 bits
- Frequency domain resource assignment
    • For resource allocation type 0, $\lceil N_{RB}^{UL,BWP}/P \rceil$ bits
    • For resource allocation type 1, $\lceil \log_2(N_{RB}^{UL,BWP}(N_{RB}^{UL,BWP}+1)/2) \rceil$ bits
- Time domain resource assignment-1, 2, 3, or 4 bits
- VRB-to-PRB mapping-0 or 1 bit, only for resource allocation type 1.
    • 0 bit if only resource allocation type 0 is configured;
    • 1 bit otherwise.
- Frequency hopping flag-0 or 1 bit, only for resource allocation type 1.
    • 0 bit if only resource allocation type 0 is configured;
    • 1 bit otherwise.
- Modulation and coding scheme-5 bits
- New data indicator-1 bit
- Redundancy version-2 bits
- HARQ process number-4 bits
- 1st downlink assignment index-1 or 2 bits
    • 1 bit for semi-static HARQ-ACK codebook;
    • 2 bits for dynamic HARQ-ACK codebook with single HARQ-ACK codebook
  2nd downlink assignment index-0 or 2 bits
    • 2 bits for dynamic HARQ-ACK codebook with two HARQ-ACK sub-codebooks;
    • 0 bit otherwise.
- TPC command for scheduled PUSCH-2 bits
- SRS resource indicator- $$\left\lceil \log_2\left(\sum_{k=1}^{L_{max}} \binom{N_{SRS}}{k}\right)\right\rceil \text{ or } \lceil \log_2(N_{SRS}) \rceil \text{ bits}$$

• $\left\lceil \log_2\left(\sum_{k=1}^{L_{max}} \binom{N_{SRS}}{k}\right)\right\rceil$ bits for non-codebook based PUSCH transmission;

• $\lceil \log_2(N_{SRS}) \rceil$ bits for codebook based PUSCH transmission.
- Precoding information and number of layers-up to 6 bits
- Antenna ports-up to 5 bits
- SRS request-2 bits
- CSI request-0, 1, 2, 3, 4, 5, or 6 bits
- Cell Block Group (CBG) transmission information-0, 2, 4, 6, or 8 bits
- PTRS-DMRS association-0 or 2 bits.
- beta_offset indicator-0 or 2 bits
- DMRS sequence initialization-0 or 1 bit A DCI format 1_0 may be used as the fallback DCI scheduling the PDSCH. At this time, the CRC may be scrambled with the C-RNTI.

In an embodiment, the DCI format 1_0 in which the CRC is scrambled with the C-RNTI may include the following information items.

TABLE 5

- Identifier for DCI formats - [1] bit
- Frequency domain resource assignment -[[ $\log_2(N_{RB}^{UL,BWP} (N_{RB}^{UL,BWP} +1)/ 2)$ ] ] bits
- Time domain resource assignment - X bits
- VRB-to-PRB mapping - 1 bit.
- Modulation and coding scheme - 5 bits
- New data indicator - 1 bit
- Redundancy version - 2 bits
- HARQ process number - 4 bits
- Downlink assignment index - 2 bits
- TPC command for scheduled PUCCH - [2] bits
- PUCCH resource indicator - 3 bits
- PDSCH-to-HARQ feedback timing indicator - [3] bits Alternatively, the DCI format 1_0 may be used as the DCI scheduling the PDSCH for the RAR message. At this time, the CRC may be scrambled with the RA-RNTI. The DCI format 1_0 in which the CRC is scrambled with the RA-RNTI may include the following information items.

TABLE 6

- frequency domain resource assignment [$\log_2(N_{RB}^{DL,BWP} (N_{RB}^{DL,BWP} +1)/2$] bits
- Time domain resource assignment - 4 bits
- VRB-to-PRB mapping - 1 bit
- Modulation and coding scheme - 5 bits
- TB scaling - 2 bits
- Reserved bits - 16 bits A DCI format 1_1 may be used as the non-fallback DCI scheduling the PDSCH. At this time, the CRC may be scrambled with the C-RNTI. In an embodiment, the DCI format 1_1 in which the CRC is scrambled with the C-RNTI may include the following information items.

TABLE 7

- Carrier indicator - 0 or 3 bits
- Identifier for DCI formats - [1] bits
- Bandwidth part indicator - 0, 1 or 2 bits
- Frequency domain resource assignment
  • For resource allocation type 0, ⌈$N_{RB}^{DL,BWP} / P$⌉ bits
  • For resource allocation type 1, ⌈$\log_2(N_{RB}^{DL,BWP} (N_{RB}^{DL,BWP} +1)/ 2)$⌉ bits
- Time domain resource assignment -1, 2, 3, or 4 bits
   VRB-to-PRB mapping - 0 or 1 bit, only for resource allocation type 1.
  • 0 bit if only resource allocation type 0 is configured;
  • 1 bit otherwise.
- PRB bundling size indicator - 0 or 1 bit
- Rate matching indicator - 0, 1, or 2 bits
- ZP CSI-RS trigger - 0, 1, or 2 bits
For transport block 1:
- Modulation and coding scheme - 5 bits
- New data indicator - 1 bit
- Redundancy version - 2 bits
For transport block 2:
- Modulation and coding scheme - 5 bits
- New data indicator - 1 bit
- Redundancy version - 2 bits
- HARQ process number - 4 bits
- Downlink assignment index - 0 or 2 or 4 bits
- TPC command for scheduled PUCCH - 2 bits
- PUCCH resource indicator - 3 bits
- PDSCH-to-HARQ_feedback timing indicator - 3 bits
- Antenna ports - 4, 5 or 6 bits
- Transmission configuration indication - 0 or 3 bits
- SRS request - 2 bits TABLE 7-continued

Figure 5:
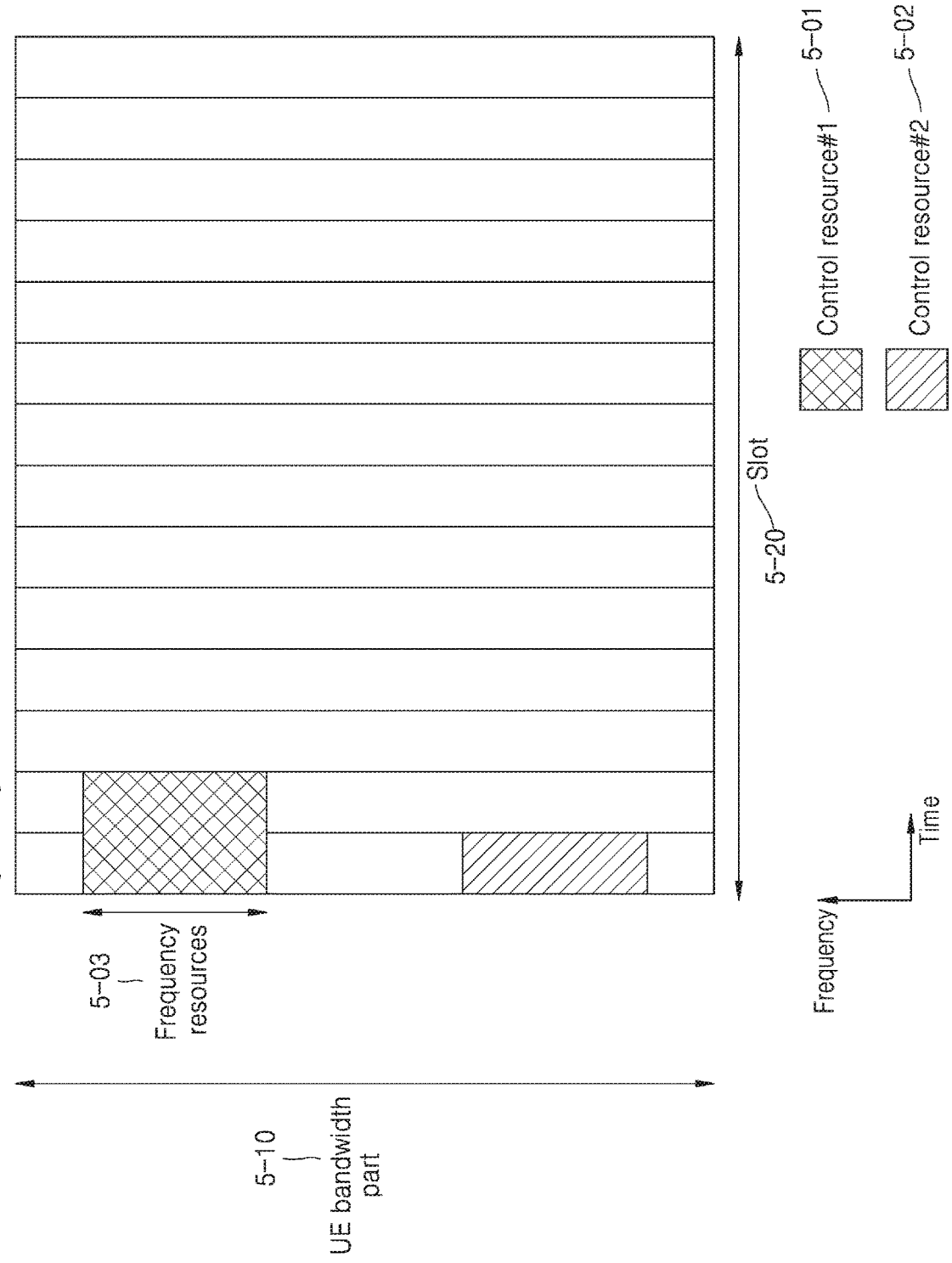
FIG. 5 illustrates a control area in which a downlink control channel is transmitted in a 5G wireless communication system according to an embodiment of the inventive concept.

- CBG transmission information - 0, 2, 4, 6, or 8 bits
- CBG flushing out information - 0 or 1 bit
- DMRS sequence initialization - 1 bit FIG. 5 illustrates a control area (a CORESET) to which a downlink control channel is transmitted in a 5G wireless communication system according to an embodiment of the inventive concept.

FIG. 5 illustrates an embodiment in which a terminal BWP 5-10 is set in a frequency axis and two control areas (a control area #1 5-01 and a control area #2 5-02) are set in one slot 5-20 in a time axis. The control areas #1 and #2 5-01 and 5-02 may be set in a specific frequency resource 5-03 in the terminal BWP 5-10 in the frequency axis. The control areas #1 and #2 5-01 and 5-02 may be set as one or a plurality of OFDM symbols in the time axis, which may be defined as a control area length (a CORESET duration) 5-04. Referring to FIG. 5, the control area #1 5-01 may be set as a control area length of two symbols and the control area #2 5-02 may be set as a control area length of one symbol.

The control area in the above-described next generation mobile communication system (the 5G or NR system) may be set by the base station performing upper layer signaling (for example, SI, MIB, or RRC signaling) on the terminal. Setting the control area in the terminal means providing information such as an ID of the control area, a frequency position of the control area, and a symbol length of the control area to the terminal. For example, the setting of the control area may include the following information items.

TABLE 8

```
ControlResourceSet ::= SEQUENCE {
    -- Corresponds to L1 parameter 'CORESET-ID'
    controlResourceSetId       ControlResourceSetId,
    frequencyDomainResources   BIT STRING (SIZE (45)),
    duration                   INTEGER (1 ..maxCoReSetDuration),
    cce-REG-MappingType
                               CHOICE {
        interleaved            SEQUENCE {
            reg-BundleSize     ENUMERATED {n2, n3, n6},
            precoderGranularity ENUMERATED {sameAsREG-bundle,
                                   allContiguousRBs},
            interleaverSize    ENUMERATED {n2, n3, n6}
            shiftIndex         INTEGER (0 ..
                                   maxNrofPhysicalResourceBlocks-
                                   1) OPTIONAL },
        nonInterleaved         NULL },
    tci-StatesPDCCH            SEQUENCE(SIZE (1 ..maxNrofTCI-
                                   StatesPDCCH)) OF TCI-StateId
                                   OPTIONAL,
    tci-PresentInDCI           ENUMERATED {enabled}
                                   OPTIONAL, - Need S
}
```

In the above table, tci-StatesPDCCH (hereinafter, referred to as 'TO state') setting information may include information on one or a plurality of SS/PBCH block indexes or channel state information reference signal (CSI-RS) indexes in a quasi co located (QCL) relationship with a DMRS transmitted by the corresponding control area, frequencyDomainResources setting information sets frequency resource of the corresponding CORESET as a bitmap. Here, each bit indicates a group of six PRBs that do not overlap. A first group means the group of the six PRBs in which a first PRB index is $6 \cdot [N_{BWP}^{start}/6]$, wherein $N_{BWP}^{start}$ represents a BWP starting point. The uppermost bit of the bitmap indicates a first group and is set in ascending order.

Figure 6:
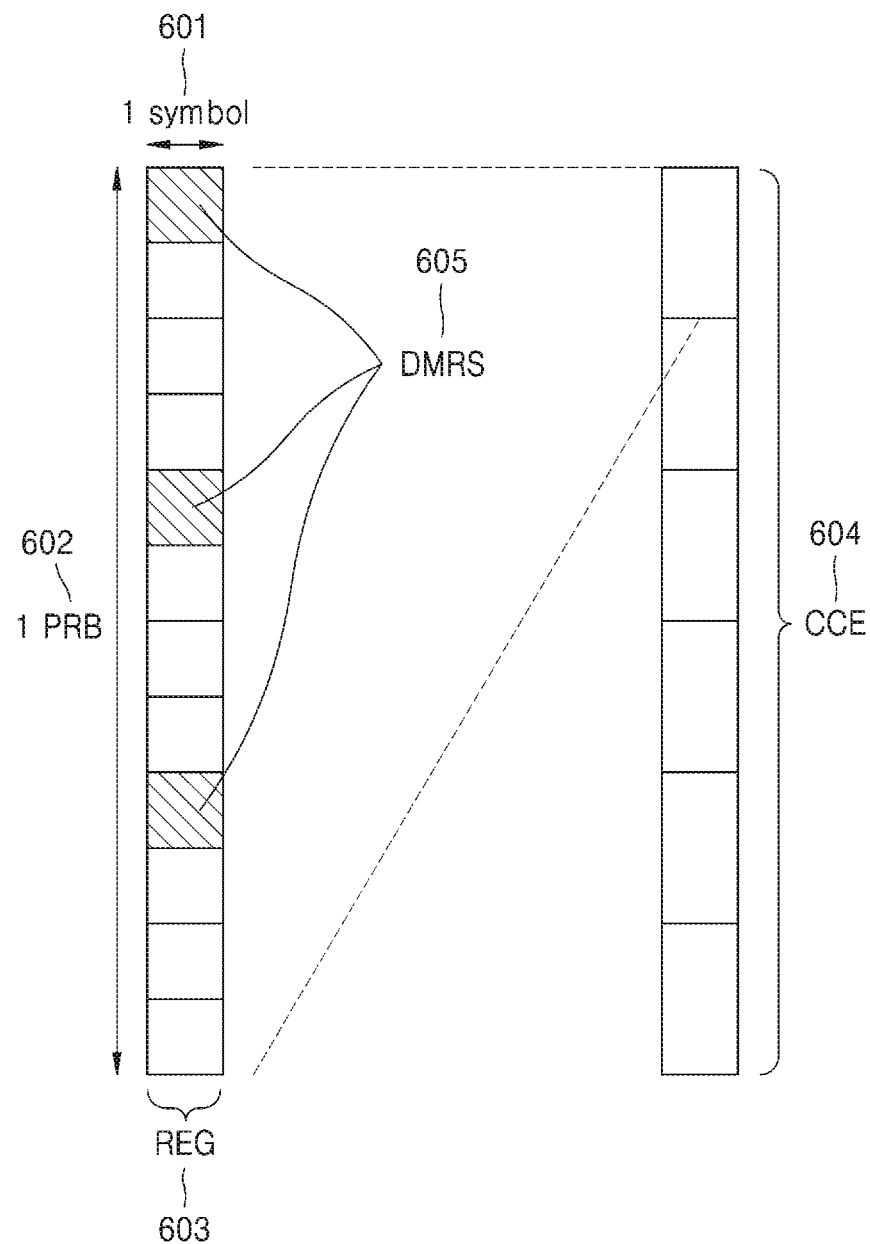
FIG. 6 illustrates a structure of a downlink control channel of a wireless communication system according to an embodiment of the inventive concept.

FIG. 6 illustrates a structure of a downlink control channel of a wireless communication system according to an embodiment of the inventive concept.

Referring to FIG. 6, a basic unit of time and frequency resource configuring a control channel may be defined as a resource element group (REG) 6-03, The REG 6-03 may be defined by one OFDM symbol 6-01 in a time axis and one PRB 6-02, that is, 12 subcarriers in a frequency axis. The base station may be connected to the REG 6-03 and may configure a downlink control channel assignment unit.

In a 5G system, when a basic unit in which the downlink control channel is assigned is a control channel element (CCE) 6-04, the CCE 6-04 may include a plurality of REGs 6-03. For example, when the REG 6-03 illustrated in FIG. 6 includes 12 REs and the CCE 6-04 includes six REGs 6-03, the CCE 6-04 may include 72 REs. When a downlink control area is set, the corresponding area may include a plurality of CCEs 6-04 and a specific downlink control channel may be mapped to the one CCE 6-04 or the plurality of CCEs 6-04 in accordance with an aggregation level (AL) in the control area and may be transmitted. The plurality of CCEs 6-04 in the control area are distinguished by number. At this time, the plurality of CCEs 6-04 may be numbered in accordance with a logical mapping method.

A basic unit of the downlink control channel illustrated in FIG. 6 (e.g., the REG 6-03) may include REs to which the DCI is mapped and an area in which DMRSs 6-05 for decoding the REs are mapped. As illustrated in FIG. 6, three DMRSs 6-05 in the REG 6-03 may be transmitted. The number of CCEs used for transmitting the PDCCH may be 1, 2, 4, 8, or 16 in accordance with the AL and the different numbers of CCEs may be used for implementing link adaptation of the downlink control channel. For example, when AL=L, one downlink control channel may be transmitted through L CCEs.

The terminal detects a signal without information on the downlink control channel so that an SS representing a set of CCEs may be defined for blind decoding. The SS is a set of downlink control channel candidates including CCEs that the terminal may attempt to decode at a given AL. Because there are several ALs each making a suite with each of 1, 2, 4, 8, and 16 CCEs, the terminal may have a plurality of SSs. An SS set may be defined by a set of SSs at all the set ALs.

The SSs may be divided into CSSs and terminal-specific SSs. According to an embodiment of the inventive concept, terminals of a certain group or all terminals may investigate the CSS of the PDCCH in order to receive control information common to a cell such as a dynamic scheduling or paging message for system information. For example, the terminal may receive PDSCH scheduling assignment information for transmitting the SIB including business information of the cell by investigating the CSS of the PDCCH. In the CSS, because terminals of a certain group or all terminals may receive the PDCCH, the CSS may be defined as a set of promised CCEs. On the other, the terminal may receive scheduling assignment information of the terminal-specific PDSCH or PUSCH by investigating the UE-specific SS of the PDCCH. The terminal-specific SS may be terminal-specifically defined by the ID of the terminal and a function of various system parameters.

In a 5G system, a parameter for an SS of the PDCCH may be set from the base station to the terminal by the upper layer signaling (e.g., the SIB, NEB, or RRC signaling). For example, the base station may set the number of PDCCH candidates in each AL L, a monitoring period of the SS, a monitoring occasion in units of symbols in a slot for the SS, an SS type (the CSS or the terminal-specific SS), a combination of a DCI format and an RNTI to be monitored in the corresponding SS, and a control area index for monitoring the SS to the terminal. For example, the above-described setting may include the following information items.

TABLE 9

```
SearchSpace ::= SEQUENCE {
    -- Identity of the search space. SearchSpaceId = 0 identifies the SearchSpace
configured via PBCH (MIB) or ServingCellConfigCommon.
    searchSpaceId
    SearchSpaceId,
    controlResourceSetId              ControlResourceSetId,
    monitoringSlotPeriodicityAndOffset CHOICE {
        sl1                           NULL,
        sl2                           INTEGER (0..1),
        sl4                           INTEGER (0 .3),
        sl5                           INTEGER (0..4),
        sl8                           INTEGER (0..7),
        sl10                          INTEGER (0..9),
        sl16                          INTEGER (0..15),
        sl20                          INTEGER (0..19)
    }
                                      OPTIONAL,
    duration                          INTEGER (2..2559)
    monitoringSymbolsWithinSlot       BIT STRING (SIZE (14))
                                      OPTIONAL,
    nrofCandidates                    SEQUENCE {
        aggregationLevel1
        ENUMERATED {n0, n1, n2, n3, n4, n5, n6, n8},
        aggregationLevel2
        ENUMERATED {n0, n1, n2, n3, n4, n5, n6, n8},
        aggregationLevel4
        ENUMERATED {n0, n1, n2, n3, n4, n5, n6, n8},
        aggregationLevel8
        ENUMERATED {n0, n1, n2, n3, n4, n5, n6, n8},
        aggregationLevel16
        ENUMERATED {n0, n1, n2, n3, n4, n5, n6, n8}
    },
    searchSpaceType                   CHOICE {
        -- Configures this search space as common search space (CSS) and DCI
formats to monitor.
        common
        SEQUENCE {
    }
        ue-Specific
        SEQUENCE {
        -- Indicates whether the terminal monitors in this USS for DCI formats 0-0 and
1-0 or for formats 0-1 and 1-1.
        formats                       ENUMERATED {formats0-0-And-1-0,
formats0-1-And-1-1},
        ...
    }
}
```

The base station may set one or a plurality of SS sets to the terminal. According to an embodiment of the inventive concept, the base station may set an SS set 1 and an SS set 2, may set a DCI format A scrambled with an x-RNTI in the SS set 1 to be monitored in the CSS, and may set a DCI format B scrambled with a Y-RNTI in the SS set 2 to be monitored in the terminal-specific SS.

In accordance with setting information, the one SS set or the plurality of SS sets may be provided in the CSS or the terminal-specific SS. For example, an SS set #1 and an SS set #2 may be set as the CSSs and an SS set #3 and an SS set #4 may be set as the terminal-specific SSs. The CSS may be classified as a specific type SS set. An RNTI to be monitored may vary by determined SS set type. For example, CSS types, objects, and RNTIs to be monitored are as follows.

TABLE 10

| Search Space Type | Object | RNTI |
| --- | --- | --- |
| Type0 CSS | PDCCH transmission for SIB schedule | SI-RNTI |
| Type0A CSS | PDCCH transmission for SI schedule (such as SIB2) other than SIB1 | SI-RNTI |

TABLE 10-continued

| Search Space Type | Object | RNTI |
|---|---|---|
| Type1 CSS | PDCCH transmission for random access response (RAR) schedule, Msg3 retransmission schedule, and Msg4 schedule | RA-RNTI, TC-RNTI |
| Type2 CSS | Paging | P-RNTI |
| Type3 CSS | Group control information transmission | INT-RNTI, SFI-RNTI, TPC-PUSCH-RNTI, TPC-PUCCH-RNTI TPC-SRS-RNTI |
|  | In case of PCell, PDCCH transmission for data schedule | C-RNTI, MCS-C-RNTI, CS-RNTI |

According to various embodiments, each of the DCI format 0_0 and the DCI format 1_0 may be scrambled based on at least one of the C-RNTI, a configured scheduling (CS)-RNTI, an SP-CSI-RNTI, the RA-RNTI, the TC-RNTI, the P-RNTI, and the SI-RNTI. A DCI format 2_0 may be scrambled based on the SH-RNTI. A DCI format 2_1 may be scrambled based on an interruption (INT)-RNTI. A DCI format 2_2 may be scrambled based on at least one of a TPC-PUSCH-RNTI and a TPC-PUCCH-RNTI. A DCI format 2_3 may be scrambled based on a TPC-sounding reference symbol (SRS)-RNTI. Above-described combinations of the DCI formats and the RNTIs may be monitored. However, the inventive concept is not limited thereto.

According to various embodiments, in the terminal-specific SS, each of the DCI format 0_0 and the DCI format 1_0 may be CRC scrambled based on at least one of the C-RNTI, the CS-RNTI, and the TC-RNTI. The DCI format 1_0 and the DCI format 1_1 may be CRC scrambled based on at least one of the C-RNTI, the CS-RNTI, and the TC-RNTI. Here, the C-RNTI may be used for scheduling the terminal-specific PDSCH, the TC-RNTI may be used for scheduling the terminal-specific PDSCH, the CS-RNTI may be used for scheduling the semi-statically set terminal-specific PDSCH, the RA-RNTI may be used for scheduling the PDSCH in the random access process, the P-RNTI may be used for scheduling the PDSCH to which paging is transmitted, the SI-RNTI may be used for scheduling the PDSCH to which the system information is transmitted, the INT-RNTI may be used for informing whether the PDSCH is punctured, the TPC-PUSCH-RNTI may be used for instructing power control for the PUSCH, the TPC-PUCCH-RNTI may be used for instructing power control for the physical uplink control channel (PUCCH), and the TPC-SRS-RNTI may be used for instructing power control for an SRS.

In an embodiment, the above-described DCI formats may be defined as follows.

TABLE 11

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbols(s) where UE may assume no transmission intended for the UE |

TABLE 11-continued

| DCI format | Usage |
|---|---|
| 2_2 | Transmission of TPC commands for PUCCH and PUSCH |
| 2_3 | Transmission of a group of TPC commands for SRS transmissions by one or more UEs |

In a 5G system, when the CORESET is p and the SS set is s, the SS of the AL L may be represented by the following equation:

$$L \cdot \left\{ \left( Y_{p,n^\mu_{s,f}} + \left\lfloor \frac{m_{s,n_{CI}} \cdot N_{CCE,p}}{L \cdot M^{(L)}_{p,s,max}} \right\rfloor + n_{CI} \right) \mod \lfloor N_{CCE,p} / L \rfloor \right\} + i$$

wherein, L may represent the AL, $n_{CI}$ may represent a carrier index, $N_{CCE,p}$ may represent the number of CCEs provided in the CORESET p, $n^\mu_{s,f}$ may represent a slot index, $M^{(L)}_{p,s,max}$ may represent the number of PDCCH candidates of the AL L, $m_{snCI}=0, \ldots, M^{(L)}_{p,s,max-1}$ may represent indexes of the PDCCH candidates of the AL L, $i=0, \ldots, L-1$, $Y_{p,n_{s,f}^\mu}=(A_p \cdot Y_{p,n_{s,f}^\mu-1}) \mod D$, $Y_{p-1}=n_{RNTI} \neq 0$, $A_0=39827$, $A_1=39829$, $A_2=39839$, $D=65537$, $n_{RNTI}$ may represent a terminal identifier, a $Y\_(p,n^\mu_{s,f})$ value may correspond to 0 in the CSS, and a $Y\_(p,n^\mu_{s,f})$ value may correspond to a value varying in accordance with ID of the terminal (the C-RNTI or ID set by the base station to the terminal) and a time index in the terminal-specific SS.

According to an embodiment of the inventive concept, in a 5G system, a plurality of SS sets may be set as different parameters (for example, the parameters of the table 10). Therefore, a set of the SS sets monitored by the terminal may vary at every point. For example, when the SS set #1 is set in an X-slot period, the SS set #2 is set in a Y-slot period, and X and Y are different from each other, the terminal may monitor both the SS set #1 and the SS set #2 in a specific slot and may monitor one of the SS set #1 and the SS set #2 in a specific slot.

On the other hand, in an NR system, up/downlink HARQ adopts an asynchronous HARQ method in which a data retransmission time is not fixed. When the downlink HARQ is taken as an example, when the base station receives HARQ NACK for transmitted initial transmission data from the terminal, the base station freely determines a transmission time of retransmission data by a scheduling operation. The terminal may buffer data determined to be erroneous as a result of decoding received data for a HARQ operation and may combine the buffered data with data retransmitted from the base station. HARQ ACK/NACK information of the PDSCH transmitted in a sub-frame n-k may be transmitted from the terminal to the base station in a sub-frame n through the PUCCH or the PUSCH. In a 5G communication system such as an NR system, the k value may be transmitted while being included in the DCI instructing or scheduling reception of the PDSCH transmitted in the sub-frame n-k or may be set to the terminal through an upper signal. At this time, the base station may set one or more k values as the upper signal and may indicate a specific k value through the DCI. At this time, the k may be determined in accordance with HARQ-ACK processing ability of the terminal, that is, a minimum time used for the terminal receiving the PDSCH and generating and reporting HARQ-ACK for the PDSCH. In addition, the terminal may use a predefined value or a default value before the k value is received.

Figure 7:
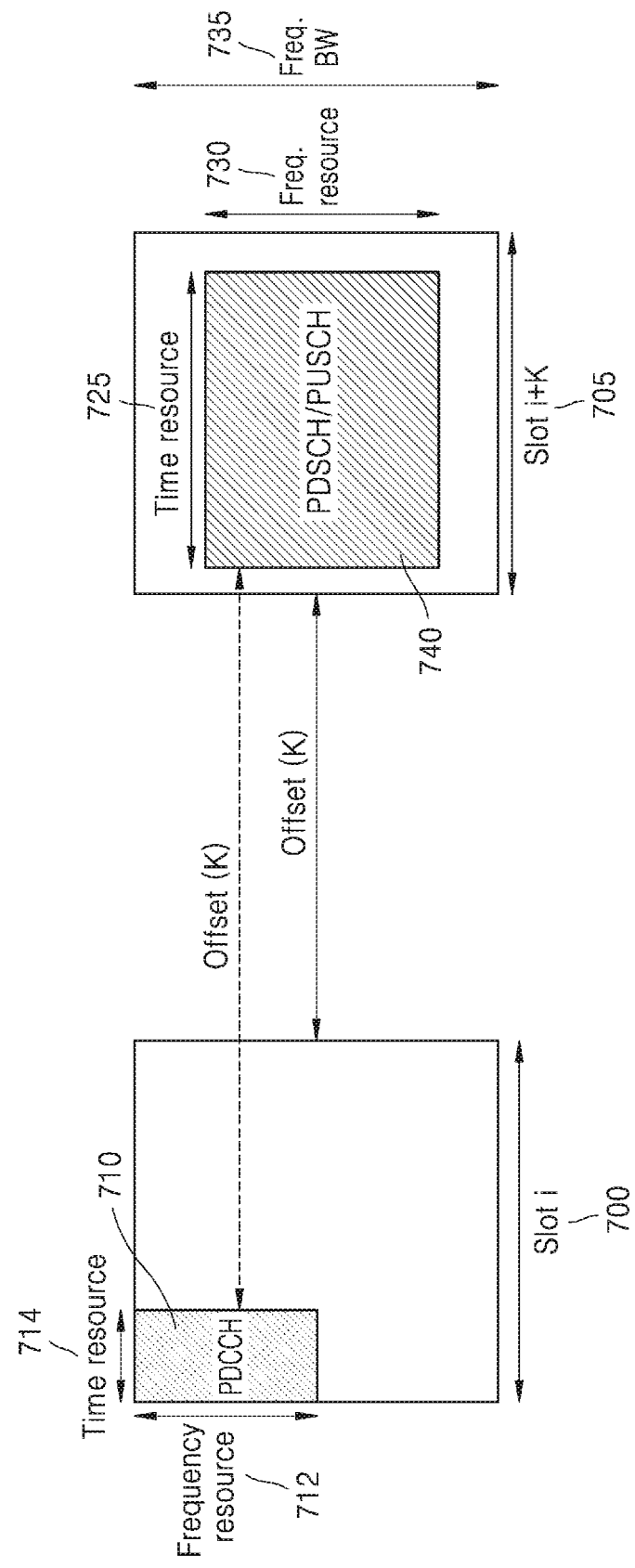
FIG. 7 illustrates a resource area to which a data channel is transmitted in a 5G communication system.

FIG. 7 illustrates a resource area to which a data channel is transmitted in a 5G communication system.

Referring to FIG. 7, the terminal monitors or searches a PDCCH 710 in a downlink control channel (e.g., referred to as the PDCCH) area (e.g., referred to as the CORESET or the SS), which may be set by the base station through the upper signal. At this time, the downlink control channel area includes information items on a time resource of a time domain 714 and a frequency resource of a frequency domain 712 (e.g., the information on the time resource of the time domain 714 may be set in units of symbols and the information on the frequency resource of the frequency domain 712 may be set in units of RBs or groups of the RBs), When the terminal detects the PDCCH 710 in a slot i 700, the terminal obtains the DCI transmitted through the PDCCH 710, Through the received DCI, the terminal may obtain scheduling information on a downlink data channel or an uplink data channel. That is, the DCI may include information on a resource area (or a PDSCH reception area) in which the terminal may receive the downlink data channel (e.g., the PDSCH) transmitted by the base station. Additionally or alternatively, the DCI may include information on a resource area (or a PUSCH transmission area) in which the terminal may transmit the uplink data channel (the PUSCH). Description will be given as follows taking a case in which the terminal is scheduled to transmit the uplink data channel (the PUSCH) as an example. The terminal receiving the DCI may obtain a slot that may receive the PUSCH or offset information K through the DCI and may determine a PUSCH transmission slot. For example, it may be determined that the terminal is scheduled to transmit the PUSCH in a slot i+K 705 through the received offset information K based on the slot i 700 receiving the PDCCH 710. At this time, the terminal may determine the slot i+K 705 or a PUSCH start symbol or time in the slot i+K 705 through the received offset information K based on the CORESET receiving the PDCCH 710. In addition, the terminal may obtain information on a PUSCH transmission time-frequency resource area 740 in the slot i+K 705 in the DCI. At this time, PUSCH transmission frequency resource area information 730 may be the PRB or group unit information of the PRB. On the other hand, the PUSCH transmission frequency resource area information 730 is included in an initial uplink BW or an initial uplink BWP determined or set by the terminal through the initial connection process. When the terminal sets the initial uplink BW or the initial uplink BWP through the upper signal, the PUSCH transmission frequency resource area information 730 is included in the initial uplink BW or the initial uplink BWP set through the upper signal.

PUSCH transmission time resource area information 725 may include a symbol or group unit information of the symbol or absolute time information. At this time, the PUSCH transmission time resource area information 725 may be represented as a PUSCH transmission starting time, lengths of a symbol and PUSCH, a PUSCH ending time, or a combination of symbols and may be included in the DCI as a field or a value. At this time, the PUSCH transmission time resource area information 725 may be included in the DCI as a field or a value representing the PUSCH transmission starting time, the lengths of the symbol and the PUSCH, the PUSCH ending time, or each symbol. The terminal may transmit the PUSCH in the PUSCH transmission time-frequency resource area 740 determined through the DCI.

Hereinafter, a method of assigning frequency domain resource to a data channel in a 5G communication system will be described. In a 5G system, in a method of indicating frequency domain resource assignment information of the PDSCH and the PUSCH, three types, that is, a resource assignment type 0, a resource assignment type 1, and a resource assignment type 2 may be supported.

In an embodiment, in the resource assignment type 0, RB assignment information may be notified from the base station to the terminal in the form of a bitmap for a resource block group (RBG). At this time, the RBG may be a set of continuous virtual RBs (VRBs) and a size P of the RBG may be determined based on a value set as an upper layer parameter and a value of a size of a BWP defined by the following table.

TABLE 12

| Bandwidth Part Size | Configuration 1 | Configuration 2 |
| --- | --- | --- |
| 1-36 | 2 | 4 |
| 37-72 | 4 | 8 |
| 73-144 | 8 | 16 |
| 145-275 | 16 | 16 |

The number $N_{RBG}$ of RBGs of a BWP i having a size of $N_{BWP,i}^{size}$ may be defined as follows:

$$N_{RBG}=\lceil(N_{BWP,i}^{size}+(N_{BWP,i}^{start} \bmod P))/P\rceil$$

wherein, a size of a first RBG is $RBG_0^{size}=P-N_{BWP,i}^{start} \bmod P$ and, when a condition of $(N_{BWP,i}^{start}+N_{BWP,i}^{size}) \bmod P>0$ and P otherwise is satisfied, a size of a last RBG may be $RGB_{last}^{size}=(N_{BWP,i}^{start}+N_{BWP,i}^{size}) \bmod P$ and a size of a remaining RBG may be P.

Bits of the bitmap having a size of $N_{RBG}$ bits may respectively correspond to the RBGs. Indexes may be given to the RBGs from the lowermost frequency position of the BWP in the order of increase in frequency. For the $N_{RBG}$ RBGs in the BWP, an RBG #0 and an RBG #($n_{RBG}-1$) may be mapped as the MSB and the LSB of the RBG bitmap. When a specific bit value in the bitmap is 1, the terminal may determine that an RBG corresponding to the corresponding bit value is assigned and, when a specific bit value in the bitmap is 0, the terminal may determine that an RBG corresponding to the corresponding bit value is not assigned.

In an embodiment, when a resource assignment type is 1, RB assignment information may be notified from the base station to the terminal as information on starting positions and lengths of continuously assigned VRBs. At this time, interleaving or non-interleaving may be additionally applied to the continuously assigned VRBs. A resource assignment field of the resource assignment type 1 may include a resource indication value (RN) and the RIV may include a starting point $RB_{start}$ of a VRB and lengths $L_{RBs}$ of continuously assigned RBs. More specifically, an RIV having a size $N_{BWP}^{size}$ in the BWP may be defined as follows:

if $(L_{RBs}-1) \leq \lfloor N_{BWP}^{size}/2 \rfloor$ then $RIV=N_{BWP}^{size}(L_{RBs}-1)+RB_{start}$ else $RIV=N_{BWP}^{size}(N_{BWP}^{size}-L_{RBs}+1)+(N_{BWP}^{size}-1-RB_{start})$ where $L_{RBs} \geq 1$ and shall not exceed $N_{BWP}^{size}-RB_{start}$.

In LTE and NR, in a state in which the terminal is connected to a serving base station, the terminal reports capability supported by the terminal to the corresponding base station, which is referred to as terminal capability (report) in the following description. The base station may transmit a terminal capability enquiry message requesting a capability report from the terminal connected thereto. The terminal capability enquiry message may include terminal capability request by radio access technology (RAT) type. In some examples, the terminal capability request by RAT type may include frequency band information. In addition, the terminal capability enquiry message may request a plurality of RAT types to one RRC message container or a plurality of terminal capability enquiry messages including terminal capability request by RAT type may be transmitted to the terminal. That is, terminal capability enquiry is repeated and the terminal may configure and report an terminal capability information message corresponding to the terminal capability enquiry. In a next generation mobile communication system, terminal capability may be requested for NR, LTE, EN-DC, and MR-DC. For reference, the terminal capability enquiry message is commonly transmitted at an initial state after the terminal is connected. However, the terminal capability enquiry message may be requested under any condition when the base station requests the terminal capability enquiry message.

In the above stage, the terminal requested by the base station to report the terminal capability configures terminal capability in accordance with RAT type and band information requested by the base station. A method of the terminal configuring the terminal capability in the NR system is described in more detail herein.

1. When the terminal receives a list of LTE and/or NR band by the terminal capability request from the base station, the terminal configures band combination (BC) for EN-DC and NR standalone (SA). That is, based on bands requested to the base station by FreqBandList, a candidate list of the BC for the EN-DC and the NR SA may be configured. In addition, the band has a priority in the order described in FreqBandList.

2. When the base station requests the terminal capability to be reported by setting "EUTRA-NR-ONLY" flag or "EUTRA" flag, the terminal removes the NR SA and the BC from the candidate list of the BC. Such an operation may be performed only when an LTE base station eNB requests "EUTRA" capability.

3. Then, the terminal removes fallback BCs from the candidate list of the BC configured in the above stage, Here, the fallback BC corresponds to a case in which a band corresponding to at least one serving cell is removed from a certain super set BC and may be omitted because the super set BC may cover the fallback BC. This stage is applied to the MR-DC, that is, LTE bands. The BC left after this stage is a final "candidate BC list".

4. The terminal selects BCs suitable for the requested RAT type from the final "candidate BC list" and selects BCs to be reported. In the current stage, the terminal configures supportedBandCombinationList in the determined order. That is, the terminal configures the BCs to be reported and the terminal capability in the preset RAT type order. In addition, the terminal configures featureSetCombination for the supportedBandCombinationList and configures a list of "candidate feature set combination" from the candidate BC list from which a list of fallback BCs (including capability of the same or lower stage) is removed. The "candidate feature set combination" includes feature set combination for NR and EUTRA-NR BC and may be obtained from feature set combination of terminal-NR-Capabilities and terminal-MRDC-Capabilities container.

5. When the requested RAT type is EUTRA-NR, featureSetCombinations is included in two containers of terminal-MRDC-Capabilities and terminal-NR-Capabilities. However, feature set of NR includes only terminal-NR-Capabilities. After the terminal capability is configured, the terminal transmits the terminal capability information message including the terminal capability to the base station. The base station performs proper scheduling and transmission and reception management on the corresponding terminal based on the terminal capability received from the terminal.

On the other hand, the terminal may receive a phase tracking reference signal (PTRS) for estimating a phase of the terminal from the base station. The terminal transmits the terminal capability message including a modulation and coding scheme (MCS) value and a threshold of a bandwidth preferred for setting PTRS reception to the base station. The base station may set the PTRS reception to the terminal by upper layer signaling and may set the following information items.

TABLE 13

| | |
|---|---|
| PTRS-DownlinkConfig ::+= | SEQUENCE{ |
| frequencyDensity | SEQUENCE (SIZE (2)) OF INTEGER (1..276), |
| timeDensity | SEQUENCE (SIZE (3)) OF INTEGER (1..29), |
| epre-Ratio | INTEGER (0..3), |
| resoruceElementOffset | ENUMERATED { offset01, offset10, offset11 }, |
| ..., | |
| [[ | |
| maxNrofPorts-r16 | ENUMERATED { n1, n2 } |
| ]] | |
| } | | wherein, epre-Ratio represents an energy per resource element (EPRE) ratio between the PTRS and the PDSCH, maxNrofPorts represents the maximum number of PTRSs, resourceElementOffset represents subcarrier offset in which the PTRS is transmitted in the RB, a time density (timeDensity) and a frequency density (frequencyDensity) represent ptrs-MCS$_i$, i=1, 2, 3 and N$_{RBi}$, i=0,1 as threshold values of the following Tables 14 and 15.

In an embodiment, when the timeDensity and the frequencyDensity are set and RNTI is the same as MCS-C-RNT, C-RNTI, or CS-RNTI, the terminal may assume a PTRS receiving pattern by using the following tables 14 and 15 based on the MCS and the bandwidth in which the PTRS is provided and scheduled.

In another embodiment, when the timeDensity is not set, the terminal may assume the timeDensity as 1. When the frequencyDensity is not set, the terminal may assume the frequencyDensity as 2. When the timeDensity and the frequencyDensity are not set and a value of a scheduled MCS is no more than a specific value (for example, 5, 10, or 15) or the number of scheduled RBs is no more than a specific value (for example, 3).

In another embodiment, when a specific RNTI is transmitted, the terminal may assume that the PTRS is not transmitted. The specific RNTI may include at least one of the RA-RNTI, the SI-RNTI, and the P-RNTI.

TABLE 14

| Scheduled MCS | Time density ($L_{PT\text{-}RS}$) |
|---|---|
| $I_{MCS}$ < ptrs – MCS$_1$ | PT-RS is not present |
| ptrs – MCS1 ≤ $I_{MCS}$ < ptrs – MCS2 | 4 |
| ptrs – MCS2 ≤ $I_{MCS}$ < ptrs – MCS3 | 2 |
| ptrs – MCS3 ≤ $I_{MCS}$ < ptrs – MCS4 | 1 |

TABLE 15

| Scheduled Bandwidth | Frequency density ($K_{PT\text{-}RS}$) |
|---|---|
| $N_{RB}$ < $N_{RB0}$ | PT-RS is not present |
| $N_{RB0}$ ≤ $N_{RB}$ < $N_{RB1}$ | 2 |
| $N_{RB1}$ ≤ $N_{RB}$ | 4 |

According to various embodiments, the timeDensity may be set as 1, 2, or 4 and the PTRS in one RB may be positioned from a starting symbol of the PDSCH and may be positioned in symbol indexes increased by the timeDensity. At this time, when the DMRS is positioned, the PTRS is positioned in symbol indexes increased by the timeDensity from a symbol index (a reference symbol index) in which the DMRS is positioned. The reference symbol index may be a position of a first DMRS in a single-symbol DMRS and a second DMRS in a double-symbol DMRS. When one or more DMRSs are provided, the PTRS may be positioned in the symbol indexes increased by the timeDensity in the symbol index of the next DMRS.

In another embodiment, the frequencyDensity may be set as 2 or 4 and the PTRS may be transmitted by a reference RB every two or four RBs. The reference RB may be determined by a modulo operation of the RNTI value and the frequencyDensity.

Figure 8:
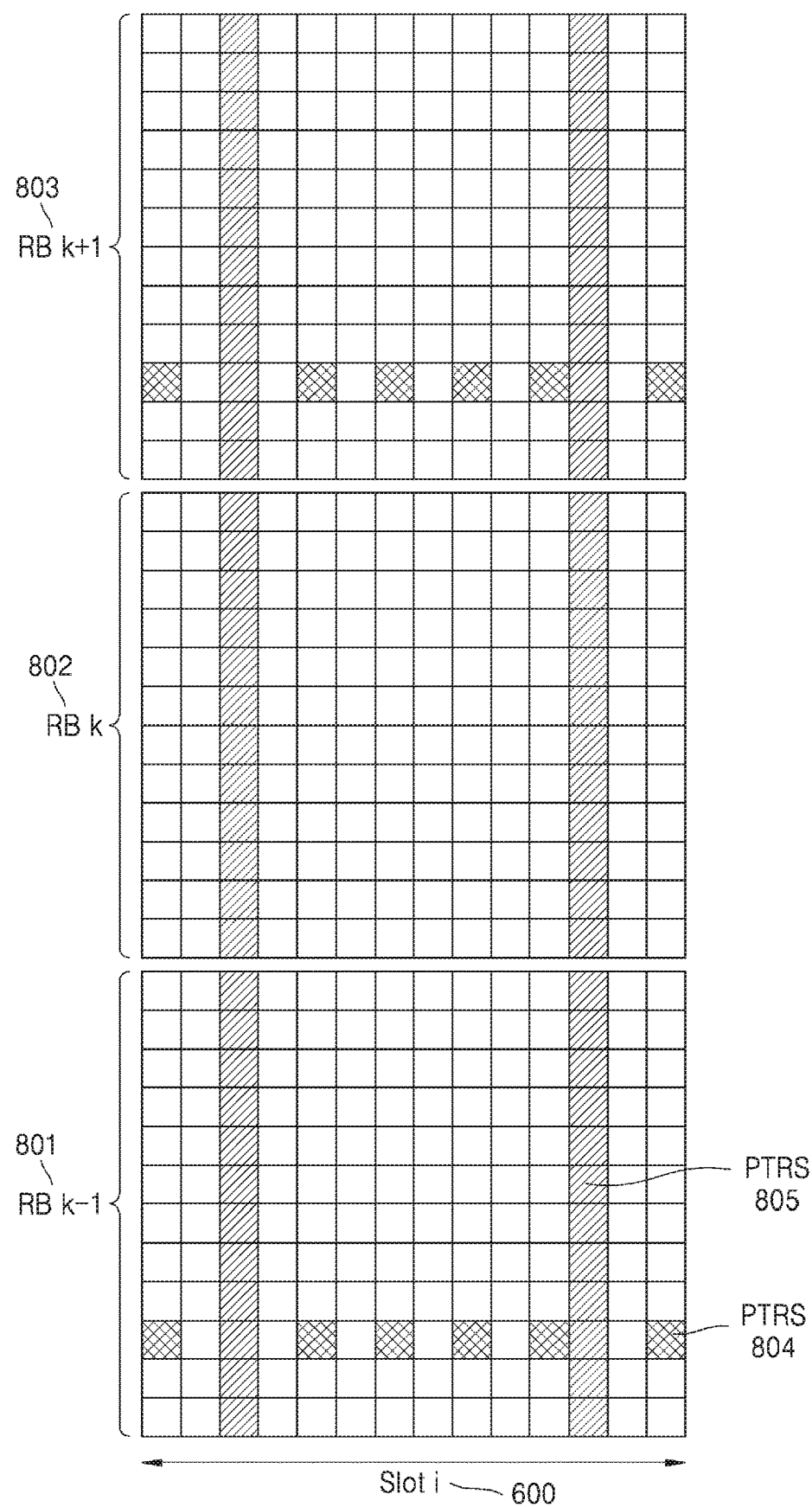
FIG. 8 illustrates an example of PTRS transmission.

FIG. 8 illustrates an example of PTRS transmission.

Referring to FIGS. 6 and 8, when freuqnecyDensity=2, timeDensity=2, and RE offset=2, the PTRS may be transmitted every 2 RBs 801 and 803 and may be positioned in symbol indexes 0, 4, 6, 8, 10, and 13.

On the other hand, the base station may set the PTRS transmission to the terminal by upper layer signaling (e.g., RRC signaling) and the terminal may expect PTRS reception when the RNTI means the MCS-C-RNTI, the C-RNTI, or the CS-RNTI. That is, when the PDSCH (e.g., the PDSCH scheduled by the DCI scrambled with the RA-RNTI, the P-RNTI, the SI-RNTI, or the TC-RNTI) is transmitted in an initial transmission stage, the base station may not set the reception to the terminal and the terminal does not expect the PTRS reception. However, as the communication system is used in a higher frequency domain (for example, a band of no less than HU or 52.6 GHz) in which phase noise becomes more severe, the base station may transmit the PTRS in order to measure phase noise at initial connection. According to the inventive concept, efficient techniques and methods of the base station and the terminal transmitting and receiving the PTRS at the initial connection are described.

Aspects of the techniques; methods, and apparatuses described herein may be described in the context of an NR system. However, the inventive concept is not limited to an NR system and may be applied to various wireless communication systems such as LIE, LTE-A, LTE-A-Pro, 5G, etc. by analogy, without departing from the scope of the present disclosure. In addition, Aspects of the techniques, methods, and apparatuses described herein may be described based on a system and equipment for transmitting and receiving a signal by using a licensed band. However, the inventive concept may also be applied to a system operating in an unlicensed band by analogy, without departing from the scope of the present disclosure. In addition, description may be given based on a cell for convenience sake. However, the inventive concept may also be applied to a method of operating one or more bandwidths such as a plurality of BWPs or sub-bands by analogy, without departing from the scope of the present disclosure.

Hereinafter, according to the inventive concept, upper layer signaling or upper signal is a method of transmitting a signal from the base station to the terminal (by using a downlink data channel of a physical layer) or a method of transmitting a signal from the terminal to the base station (by using an uplink data channel of a physical layer). Upper layer signaling or upper signal may include a method of transmitting a signal through RRC signaling, packet data convergence protocol (PDCP) signaling, or MAC control element (CE). In addition, the upper layer signaling or upper signal may include system information commonly transmitted to a plurality of terminals, for example, such as an SIB.

In various embodiments, the base station may set PTRS transmission to the PDSCH or PUSCH transmitted to the terminal by using the MIB value at an initial transmission stage. At this time, the PDSCH transmitted at the initial transmission stage may correspond to the PDSCH scheduled by the DCI scrambled based on at least one of the SI-RNTI, the RA-RNTI, the TC-RNTI, and the P-RNTI. The PUSCH transmitted in the initial transmission stage may mean the PUSCH scheduled by the DCI scrambled with the TC-RNTI.

In an embodiment, the base station may set (e.g., configure) the PTRS transmission and the PTRS reception by the terminal using a subCarrierSpacingCommon value of the MIB. Specifically, when the terminal receives the MIB in a specific carrier frequency domain (for example, the band of no less than FR3 or 52.6 GHz); it may be determined that the PTRS is transmitted by the PDSCH or the PUSCH transmitted in the initial transmission stage. At this time, the base station and the terminal may assume that PTRS transmission related setting is predetermined based on a preset value (or a default value) of the terminal and the base station. For example, it may be assumed that PTRS timeDensity is transmitted every symbol and PTRS frequencyDensity is transmitted every two RBs.

In another embodiment, the base station may set (e.g., configure) the PTRS transmission and the PTRS reception of the terminal to the terminal by ssb-SubcarrierOffset of the MIB, Specifically, when the terminal receives the MIB in the specific carrier frequency domain (for example, the band of no less than FR3 or 52.6 GHz), the terminal may determine whether the PTRS is transmitted by [X] bits of the least significant bit (LSB) (or the most significant bit (MSB)) of the ssb-SubcarrierOffset included in the MIB. For example, when the LSB of the ssb-SubcarrierOffset represents 1, the terminal may determine that the PTRS is transmitted to a channel (for example, the PDSCH or the PUSCH) received by the base station for initial transmission. At this time, the base station and the terminal may assume that setting information of the PTRS transmission is transmitted in a predetermined position based on the preset value (or the default value).

In another embodiment, the base station may set the PTRS transmission and reception of the terminal to the terminal by using a reserved bit of the MIB. Specifically, when the reserved bit of the MIB indicates a specific value (for example, 1), the terminal may determine that the PTRS is included in a channel transmitted to and received from the base station for initial transmission and is transmitted. At this time, when the terminal receives the MIB in the specific carrier frequency domain (for example, the band of no less than FR3 or 52.6 GHz), the reserved bit may be determined as a transmission identifier of the PTRS, When the terminal determines a spare bit as a specific value, the base station and the terminal may assume that the PTRS in the channel received for the initial transmission is transmitted in the predetermined position based on the preset value (or the default value).

In various embodiments, the base station may set PTRS transmission related information in the DCI. At this time, the PDSCH transmitted in the initial transmission stage may correspond to the PDSCH scheduled by the DCI scrambled based on at least one of the SI-RNTI, the RA-RNTI, the TC-RNTI, and the P-RNTI and the PUSCH transmitted in the initial transmission stage may correspond to the PUSCH scheduled by the DCI scrambled based on the TC-RNTI.

In an embodiment, the base station may include a PTRS transmission indicator in the DCI. For example, when the PTRS transmission indicator corresponds to "1" or "logic high", the terminal may determine that the PTRS is included in the channel scheduled by the corresponding DCI, In another example, when the PTRS transmission indicator corresponds to "0" or "logic low", the terminal may determine that the PTRS is not included in the channel scheduled by the corresponding DCI.

In another embodiment, the base station may add the PTRS transmission indicator to the DCI when the DCI scrambled with a specific RNTI (for example, the SI-RNTI, the RA-RNTI, and the TC-RNTI) is transmitted. The terminal receiving the PTRS transmission indicator may determine that the PTRS is included in the PDSCH or the PUSCH scheduled by the corresponding DCI. At this time, the base station and the terminal may assume that the PTRS transmission is predetermined based on the preset value (or the default value) of the terminal and the base station. For example, it may be assumed that the PTRS timeDensity is transmitted every symbol and the PTRS frequencyDensity is transmitted every two RBs.

In another embodiment, the base station may transmit the DCI with a field representing PTRS setting related information included in the DCI. The information that may be included in the DCI is as follows and the terminal may determine a PTRS position based on a received PTRS setting field value,

TABLE 16

| PTRS time density | 00: PTRS not transmitted |
| --- | --- |
|  | 01: every symbol |
|  | 10: 1/2 density |
|  | 11: 1/4 density |
| PTRS RB density | 0: 2RB |
|  | 1: 4RB |

In another embodiment, the base station may transmit the DCI scrambled with a specific RNTI (for example, the SI-RNTI, the RA-RNTI, the TC-RNTI, or the P-RNTI) with the field representing the PTRS setting related information included in the DCI as illustrated in the table 17. At this time, the terminal may determine a PTRS transmission position based on PTRS transmission information represented by a PTRS setting related information field.

In another embodiment, the base station may transmit the DCI scrambled based on the RNTI meaning the PTRS transmission. The terminal receiving the DCI scrambled with the RNTI meaning the PTRS transmission may determine that the PTRS is transmitted to the channel scheduled by the corresponding DCI. For example, the terminal receiving the DCI scrambled with an SI-PTRS-RNTI may determine that the PTRS is transmitted to the corresponding PDSCH and the field value included in the DCI may be the same as the DCI scrambled with the SI-RNTI. In addition, the base station may further include the PTRS transmission indicator in the DCI scrambled based on the RNTI meaning the PTRS transmission. For example, the terminal receiving the DCI scrambled based on the RNTI meaning the PTRS transmission may determine that the corresponding DCI includes the PTRS transmission indicator or a PTRS setting information field. At this time, the base station and the terminal may assume that PTRS transmission related setting information is transmitted in a position predetermined based on the preset value (or the default value).

In various embodiments, the terminal may interpret the PTRS transmission related information based on the DCI field value transmitted by the base station. At this time, the PDSCH transmitted at the initial transmission stage may correspond to the PDSCH scheduled by the DCI scrambled based on at least one of the SI-RNTI, the RA-RNTI, the TC-RNTI, and the P-RNTI and the PUSCH transmitted at the initial transmission stage may correspond to the PUSCH scheduled by the DCI scrambled based on the TC-RNTI.

In an embodiment, the base station and the terminal may assume that the PTRS related setting information included in the PDSCH transmitted at the initial connection stage determines an MCS range and an RB range as preset values in accordance with the following tables 17 and 18.

The base station may transmit the DCI scrambled with the specific RNTI (for example the SI-RNTI, the RA-RNTI, the TC-RNTI, and the P-RNTI) and the terminal may determine the PTRS transmission setting information of the base station by comparing the MCS index and the frequency resource assignment information included in the DCI scrambled with a specific RNTI with the default table of the following tables 17 and 18.

The default table is defined for convenience sake. However, it may be determined whether the PTRS is transmitted based on the number of specific MCSs or RBs. For example, when the MCS index indicates a value no less than (or no more than) a specific value, the terminal may assume that the PTRS is transmitted. At this time, the terminal may assume that the PTRS time density and frequency density has a preset value. In another example, when the RB indicates a value no less than (or no more than) a specific value, the terminal may assume that the PTRS is transmitted. At this time, the terminal may assume that the PTRS time density and frequency density has a preset value. In addition, it may be determined whether the PTRS is transmitted based on a combination of a specific MCS index and a specific RB value.

TABLE 17

| Scheduled MCS | Time density |
|---|---|
| $I_{MCS}$ < ptrs-default$_1$ | PT-RS is not present |
| ptrs-default1 ≤ $I_{MCS}$ < ptrs-default2 | 4 |
| ptrs-default2 ≤ $I_{MCS}$ < ptrs-default3 | 2 |
| ptrs-default3 ≤ $I_{MCS}$ < ptrs-default4 | 1 |

TABLE 18

| Scheduled bandwidth | Frequency density |
|---|---|
| $N_{RB}$ < $N_{RB0\_default}$ | PT-RS is not present |
| $N_{RB0\_default}$ ≤ $N_{RB}$ < $N_{RB1\_default}$ | 6 |
| $N_{RB1\_default}$ ≤ $N_{RB\_default}$ | 4 |

On the other hand, through a combination of the above-described embodiments and another embodiment, the base station may determine whether the PTRS is transmitted. For example, after instructing the PTRS to be transmitted through the NM, it may be determined whether the PTRS is transmitted based on the default table. In another example, after instructing the PTRS to be transmitted through the DCI, it may be determined whether the PTRS is transmitted based on the default table. In addition, in each embodiment, the preset value (or the default value) for determining the PTRS transmission position, the Table 17, and the Table 18 may set or define different values for the PDSCH and the PUSCH.

Figure 9:
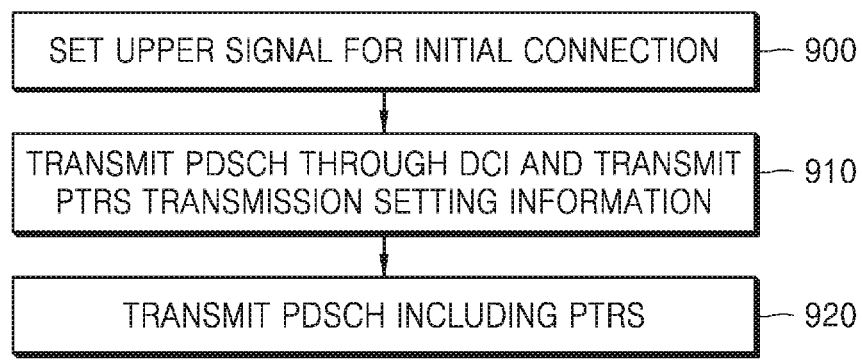
FIG. 9 illustrates an operation of a base station according to an exemplary embodiment of the inventive concept.

FIG. 9 illustrates an operation of a base station according to an exemplary embodiment of the inventive concept.

Referring to FIG. 9, in operation 900, the base station may transmit a synchronization signal and upper signal set for initial connection to the terminal. For example, a signal such as the PSS, the SSS, the PBCH, or the MIB may be transmitted to the terminal and information on whether the PTRS is included in the PDSCH transmitted for the initial connection and the PTRS transmission setting related information may be transmitted to the terminal.

In operation 910, the base station may transmit the DCI scheduling the PDSCH transmitted for the initial connection to the terminal. At this time, the DCI may include the information on whether the PTRS is included in the corresponding PDSCH and the PTRS transmission setting related information.

In operation 920, the base station may transmit the PDSCH based on the PTRS information set to the terminal in operation 900 or 910. In the above-described embodiment, description is given with reference to only the PDSCH. However, it may be assumed that the same operation is performed on the PUSCH by the base station.

Figure 10:
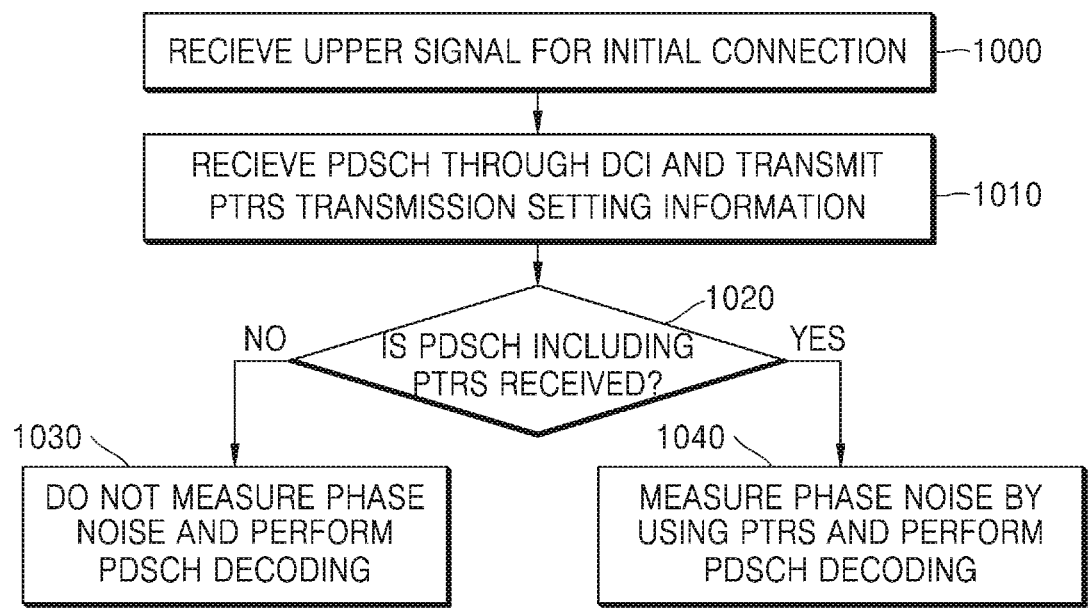
FIG. 10 illustrates an operation of a terminal according to an exemplary embodiment of the inventive concept.

FIG. 10 illustrates an operation of a terminal according to an exemplary embodiment of the inventive concept.

Referring to FIG. 10, in operation 1000, the terminal may receive a synchronization signal and upper signal set for initial connection from the base station. For example, the terminal may receive a signal such as the PSS, the SSS, the PBCH, or the MIB from the base station. At this time, the DCI may include the information on whether the PTRS is included in the PDSCH transmitted for the initial connection and the PTRS transmission setting related information.

In operation 1010, the terminal may receive the DCI scheduling the PDSCH transmitted for the initial connection from the base station. At this time, the DCI may include the information on whether the PTRS is included in the corresponding PDSCH and the PTRS transmission setting-related information.

In operation 1020, the terminal may receive the PDSCH from the base station and, when the PTRS is included in the corresponding PDSCH as a result of determining the PTRS transmission and the transmission setting of operation 1000 and operation 1010, the terminal may measure phase noise by using the PTRS based on information set in operation 1040. When it is determined in operation 1020 that the PTRS is not included in the corresponding PDSCH, the terminal may perform PDSCH decoding without using the PTRS in operation 1030.

In the above-described embodiment, description is given with reference to only the PDSCH. However, it may be assumed that the same operation is performed on the PUSCH by the terminal excluding that the operation of the terminal is terminated by transmitting the PUSCH including the PTRS in operation 1020.

Figure 11:
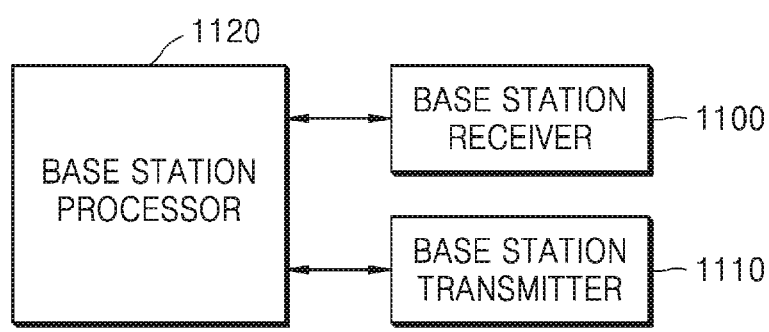
FIG. 11 is a block diagram illustrating an internal structure of a base station according to an embodiment of the inventive concept.

FIG. 11 is a block diagram illustrating an internal structure of a base station according to an embodiment of the inventive concept.

Referring to FIG. 11, the base station may include a base station receiver 1100, a base station transmitter 1110, and a base station processor 1120. The base station receiver 1100 and the base station transmitter 1110 may be referred to as a transceiver according to an embodiment of the inventive concept. The transceiver may transmit and receive a signal to and from a terminal. The signal may include control information and data. For this purpose, the transceiver may include a radio frequency (RF) transmitter for up-converting and amplifying a frequency of a transmitted signal and an RF receiver for low noise amplifying a received signal and down-converting a frequency. In addition, the transceiver may receive a signal through a wireless channel and may output the received signal to the base station processor 1120 and may transmit the signal output from the base station processor 1120 through the wireless channel.

In various embodiments, the base station processor 1120 may control a series of processes so that the base station may operate. For example, in the base station processor 1120, the base station may configure or change the MIB or the DCI including the information on whether the PTRS is included in the PDSCH or the PUSCH transmitted in the initial transmission stage and the PTRS transmission setting related information. The base station transmitter 1110 may transmit a signal including the MIB or the DCI generated by the base station processor 1120 to the terminal.

A base station may be a station that communicates with one or more terminals. In some aspects, a base station may provide communication coverage for a particular geographic area. In 3GPP, the term "cell" can refer to a coverage area of the base station depending on the context in which the term is used. In NR systems, the term "cell" and NB, next generation NB (gNB), 5G NB, access point (AP), BS, NR BS, or transmission reception point (TRP) may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network through various types of backhaul interfaces such as a direct physical connection, a virtual network, or the like using any suitable transport network.

In some aspects, the base station processor 1120 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the base station processor 1120 is configured to operate a memory array using a memory controller. In other cases, a memory controller is integrated into the base station processor 1120. In some cases, the base station processor 1120 is configured to execute computer-readable instructions stored in a memory to perform various functions. In some embodiments, a base station processor 1120 includes special purpose components for modem processing, baseband processing, digital signal processing, or transmission processing.

A base station receiver 1100 may receive information such as packets, user data, or control information associated with various information channels (e.g., control channels, data channels, etc.). Information received at a base station receiver 1100 may be passed on to other components of the device, such as a base station processor 1120. In some cases, base station receiver 1100 may be an example of aspects of a transceiver. In various examples, base station receiver 1100 may utilize a single antenna or a plurality of antennas.

A base station transmitter 1110 may transmit signals generated by other components. Information sent by a base station transmitter 1110 may be received from other components of the device, such as a base station processor 1120. In some cases, base station transmitter 1110 may be an example of aspects of a transceiver. In various examples, base station transmitter 1110 may utilize a single antenna or a plurality of antennas.

Figure 12:
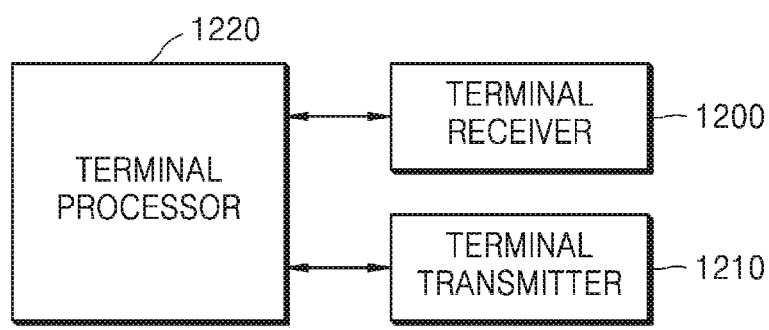
FIG. 12 is a block diagram illustrating an internal structure of a terminal according to an embodiment of the inventive concept.

FIG. 12 is a block diagram illustrating an internal e of a terminal according to an embodiment of the inventive concept.

Referring to FIG. 12, the terminal may include a terminal receiver 1200, a terminal transmitter 1210, and a terminal processor 1220. The terminal receiver 1200 and the terminal transmitter 1210 may be referred to as a transceiver according to an embodiment of the inventive concept. The transceiver may transmit and receive a signal to and from a base station. The signal may include control information and data. For this purpose, the transceiver may include an RF transmitter for up-converting and amplifying a frequency of a transmitted signal and an RF receiver for low noise amplifying a received signal and down-converting a frequency. In addition, the transceiver may receive a signal through a wireless channel and may output the received signal to the terminal processor 1220 and may transmit the signal output from the terminal processor 1220 through the wireless channel. The terminal processor 1220 may control a series of processes so that the terminal may operate according to the embodiment of the inventive concept. For example, the terminal receiver 1200 may receive a data signal including a control signal and the terminal processor 1220 may determine whether the data signal is received.

Then, when a first signal reception result including the data reception is to be transmitted to the base station at the timing, the terminal transmitter 1210 transmits the first signal reception result to the base station at the timing determined by the terminal processor 1220. In another example, the terminal receiver 1200 may receive the MIB or the DCI including the information on whether the PTRS is included in the PDSCH or the PUSCH transmitted in the initial transmission stage and the PTRS transmission setting related information from the base station. The terminal processor 1220 may determine and interpret information on whether the PTRS is transmitted, and PTRS transmission setting information based on the received MIB and DCI and may performing phase estimation and PDSCH decoding by using the PTRS.

In some cases, a terminal may be referred to as user equipment (UE). For instance, in some aspects, a terminal may include a user device such as a personal computer, a laptop computer, a mainframe computer, a palmtop computer, a personal assistant, a mobile device, or any other suitable processing apparatus. In some examples, the terminal includes software that is implemented to perform or execute one or more operations described herein.

In some aspects, terminal processor 1220 is an intelligent hardware device, (e.g., a general-purpose processing component, a DSP, a CPU, a GPU, a microcontroller, an ASIC, a FPGA, a programmable logic device, a discrete gate or transistor logic component, a discrete hardware component, or any combination thereof). In some cases, the terminal processor 1220 is configured to operate a memory array using a memory controller. In other cases, a memory, controller is integrated into the processor. In some cases, the terminal processor 1220 is configured to execute computer-readable instructions stored in a memory to perform various functions. In some embodiments, a terminal processor 1220 includes special purpose components for modem processing, baseband processing, digital signal processing, or transmission processing.

A terminal receiver 1200 may receive information such as packets, user data, or control information associated with various information channels (e.g., control channels, data channels, etc.). Information received at a terminal receiver 1200 may be passed on to other components of the device, such as a terminal processor 1220. In some cases, terminal receiver 1200 may be an example of aspects of a transceiver. In various examples, terminal receiver 1200 may utilize a single antenna or a plurality of antennas.

A terminal transmitter 1210 may transmit signals generated by other components. Information sent by a terminal transmitter 1210 may be received from other components of the device, such as a terminal processor 1220. In some cases, terminal transmitter 1210 may be an example of aspects of a transceiver. In various examples, terminal transmitter 1210 may utilize a single antenna or a plurality of antennas.

In some cases, base station processor 1120 and/or terminal processor 1220 may implement software to perform one or more aspects of the techniques and methods described herein. Software may include code to implement aspects of the present disclosure. Software may be stored in a non-transitory computer-readable medium such as system memory or other memory. In some cases, the software may not be directly executable by the processor but may cause a computer (e.g., when compiled and executed) to perform functions described herein.

As described above, base station receiver 1100, base station transmitter 1110, terminal receiver 1200, and terminal transmitter 1210 may be examples of aspects of a transceiver. A transceiver may communicate bi-directionally, via antennas, wired, or wireless links as described above. For example, the transceiver may represent a wireless transceiver and may communicate bi-directionally with another wireless transceiver. The transceiver may also include or be connected to a modem to modulate the packets and provide the modulated packets to for transmission, and to demodulate received packets. In some examples, transceiver may be tuned to operate at specified frequencies. For example, a modem can configure the transceiver to operate at a specified frequency and power level based on the communication protocol used by the modem.

In some examples, the internal structure of a base station (e.g., aspects of which are illustrated in FIG. 11), the internal structure of a terminal (e.g., aspects of which are illustrated in FIG. 12), or both, may include memory. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

While the inventive concept has been particularly shown and described with reference to embodiments thereof, it will be understood that various changes in form and details may be made therein without departing from the spirit and scope of the following claims.

What is claimed is:

1. A method of wireless communication by a terminal, the method comprising:
   receiving a synchronization signal block (SSB) from a base station;
   decoding a master information block (MIB) included in the SSB;
   identifying a value corresponding to at least one of a subcarrier spacing (SCS) of the MIB, a subcarrier offset for the SSB, or a reserved bit of the MIB in an initial connection with the base station; and
   based on the identified value, determining setting information of a phase tracking reference signal (PTRS) included in a physical downlink shared channel (PDSCH) or a physical uplink shared channel (PUSCH) for the initial connection with the base station.

2. The method of claim 1, wherein the identified value corresponds to the SCS in the initial connection with the base station and the method further comprises:
   determining that the PTRS is included in the PDSCH when the SCS indicates a predefined value, wherein the identified value comprises the predefined value.

3. The method of claim 2, wherein the PTRS is transmitted based on a predetermined time density and frequency density, and wherein the predefined value corresponds to one of 480 KHz or 960 KHz.

4. The method of claim 1, wherein the identified value corresponds to the subcarrier offset for the SSB in the initial connection with the base station and the method further comprises:
   determining whether the subcarrier offset indicates a predefined frequency domain;
   identifying a least significant bit (LSB) value among bits corresponding to the subcarrier offset, when the predefined frequency domain is indicated; and
   determining that the PTRS is included in the PDSCH or the PUSCH when the LSB value of the subcarrier offset is 1, wherein the identified value comprises the LSB value of the subcarrier offset.

5. The method of claim 4, wherein the PTRS is transmitted based on a predetermined time density and frequency density.

6. The method of claim 1, wherein the identified value corresponds to the reserved bit of the MIB in the initial connection with the base station and the method further comprises:
   determining that the PTRS is included in the PDSCH or the PUSCH when the reserved bit corresponds to a predefined value, wherein the identified value comprises the predefined value.

7. The method of claim 1, wherein the setting information included of the PTRS is included in the PDSCH transmitted with the initial connection and determines a configured modulation and coding scheme (MCS) range and a resource block (RB) range as preset values.

8. The method of claim 1, further comprising compensating for a phase distortion in a wireless communication with the base station using the setting information of the PTRS.

9. A method of wireless communication by a terminal, the method comprising:
   receiving a synchronization signal block (SSB) from a base station;
   decoding a master information block (MIB) included in the SSB;
   identifying a value corresponding to a subcarrier offset for the SSB in an initial connection with the base station; and
   determining setting information of a phase tracking reference signal (PTRS) included in a physical downlink shared channel (PDSCH) or a physical uplink shared channel (PUSCH) based on the identified value,
   wherein the identified value corresponds to the subcarrier offset for the SSB in the initial connection with the base station and the method further comprises:
   determining that the subcarrier offset indicates a predefined frequency domain;
   identifying a significant bit value among bits corresponding to the subcarrier offset indicating the predefined frequency domain; and
   determining that the PTRS is included in the PDSCH or the PUSCH when the significant bit value of the subcarrier offset corresponds to a predetermined value, wherein the identified value comprises the significant bit value of the subcarrier offset.

10. The method of claim 9, wherein the PTRS is transmitted based on a predetermined time density and frequency density.

11. The method of claim 9, wherein the setting information of the PTRS is included in the PDSCH transmitted with the initial connection and determines a configured modulation and coding scheme (MCS) range and a resource block (RB) range as preset values.

12. The method of claim 9, further comprising compensating for a phase distortion in a wireless communication with the base station using the setting information of the PTRS.

13. A method of wireless communication by a terminal, the method comprising:
- receiving a synchronization signal block (SSB) from a base station;
- decoding a master information block (MIB) included in the SSB;
- identifying a value corresponding to a reserved bit of the MIB in an initial connection with the base station; and
- determining setting information of a phase tracking reference signal (PTRS) included in a physical downlink shared channel (PDSCH) or a physical uplink shared channel (PUSCH) based on the identified value,
- wherein the identified value corresponds to the reserved bit of the MIB in the initial connection with the base station and the method further comprises determining that the PTRS is included in the PDSCH or the PUSCH when the reserved bit corresponds to a predefined value, wherein the identified value comprises the predefined value.

14. The method of claim 13, wherein the setting information of the PTRS is included in the PDSCH transmitted with the initial connection and determines a configured modulation and coding scheme (MCS) range and a resource block (RB) range as preset values.

15. The method of claim 13, further comprising compensating for a phase distortion in a wireless communication with the base station using the setting information of the PTRS.

* * * * *